(12) United States Patent
Dillon

(10) Patent No.: US 10,736,114 B2
(45) Date of Patent: Aug. 4, 2020

(54) RF CHANNEL ANALYSIS AND IMPROVED USAGE OF WIRELESS CHANNELS IN A WIRELESS NETWORK

(71) Applicant: Charter Communications Operating LLC, St. Louis, MO (US)

(72) Inventor: Matthew J. Dillon, Greenwood Village, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 127 days.

(21) Appl. No.: 15/866,737

(22) Filed: Jan. 10, 2018

(65) Prior Publication Data
US 2019/0215821 A1    Jul. 11, 2019

(51) Int. Cl.
| | |
|---|---|
| *H04W 24/00* | (2009.01) |
| *H04W 72/04* | (2009.01) |
| *H04W 72/08* | (2009.01) |
| *H04W 8/22* | (2009.01) |
| *H04W 72/02* | (2009.01) |
| H04W 72/06 | (2009.01) |

(52) U.S. Cl.
CPC ........... *H04W 72/048* (2013.01); *H04W 8/22* (2013.01); *H04W 72/02* (2013.01); *H04W 72/0446* (2013.01); *H04W 72/0453* (2013.01); *H04W 72/082* (2013.01); *H04W 72/085* (2013.01); *H04W 72/06* (2013.01)

(58) Field of Classification Search
None
See application file for complete search history.

(56) References Cited

U.S. PATENT DOCUMENTS

| | | | | |
|---|---|---|---|---|
| 7,558,571 | B2* | 7/2009 | Cave ..................... | H04W 16/10 455/434 |
| 7,558,751 | B2* | 7/2009 | Sauter .................... | G06Q 40/00 705/36 R |
| 2005/0002669 | A1* | 1/2005 | Adleman ............. | H04B 10/079 398/58 |
| 2005/0014470 | A1* | 1/2005 | Malladi ................ | H04B 17/336 455/67.13 |
| 2006/0236188 | A1* | 10/2006 | Behzad ................. | H04W 88/02 714/746 |
| 2008/0009306 | A1* | 1/2008 | Suga ..................... | H04W 52/10 455/522 |

(Continued)

*Primary Examiner* — Ayanah S George
(74) *Attorney, Agent, or Firm* — Armis IP Law, LLC

(57) ABSTRACT

According to one configuration, an analyzer resource determines an ability of a wireless access point to wirelessly communicate over each of multiple available wireless communication channels in a wireless frequency band. The analyzer resource produces performance information (performance metrics or calibration information) based on the measured ability. The analyzer resource assigns the performance metrics to the wireless access point. When operating in the field (such as in a wireless network environment), to provide mobile communication devices access to a remote network, the wireless access point uses the assigned performance metrics as a basis to select amongst multiple available wireless communication channels to communicate with one or more mobile communication devices in the wireless network environment. These and other techniques are disclosed herein.

39 Claims, 12 Drawing Sheets

(56) References Cited

U.S. PATENT DOCUMENTS

| | | | |
|---|---|---|---|
| 2011/0152910 A1* | 6/2011 | Smith | A61B 17/3496 606/185 |
| 2015/0189513 A1* | 7/2015 | Schmidt | H04W 16/02 370/329 |
| 2015/0215950 A1* | 7/2015 | Amini | H04W 52/0212 370/252 |
| 2015/0271829 A1* | 9/2015 | Amini | H04W 24/02 370/329 |
| 2017/0013539 A1* | 1/2017 | Lepp | H04W 52/0229 |
| 2018/0242359 A1* | 8/2018 | Takano | H04W 74/0808 |
| 2018/0270677 A1* | 9/2018 | Brisebois | H04W 24/08 |

* cited by examiner

| CHANNEL NAME | TRANSMIT CALIBRATION | RECEIVER CALIBRATION |
|---|---|---|
| CH #1 | -3 dB | -3 dB |
| CH #2 | -3 dB | -2 dB |
| CH #3 | -2 dB | -2 dB |
| CH #4 | -1 dB | -1 dB |
| CH #5 | 0 dB | 0 dB |
| CH #6 | 0 dB | 0 dB (DEFAULT) |
| CH #7 | 0 dB | 0 dB |
| CH #8 | 0 dB | -2 dB |
| CH #9 | -2 dB | -2 dB |
| CH #10 | -3 dB | -3 dB |
| CH #11 | -4 dB | -4 dB |

PERFORMANCE INFO. 410

FIG. 4

NOISE-ADJUSTED PERFORMANCE INFO. 610

| CHANNEL NAME | TRANSMITTER CALIBRATION | NOISE LEVEL | NOISE-ADJUSTED TRANSMIT CALIBRATION |
|---|---|---|---|
| CH #1 | -5 dB | -95 dB | .5 dB |
| CH #2 | -4 dB | -92 dB | .7 dB |
| CH #3 | -3 dB | -90 dB | .8 dB |
| CH #4 | -2 dB | -90 dB | .7 dB |
| CH #5 | -1 dB | -88 dB | .8 dB |
| CH #6 | 0 dB | -86 dB | .9 dB |
| CH #7 | 0 dB | -90 dB | .5 dB |
| CH #8 | -2 dB | -89 dB | .8 dB |
| CH #9 | -2 dB | -90 dB | .7 dB |
| CH #10 | -2 dB | -94 dB | .3 dB ← SELECTED CHANNEL |
| CH #11 | -4 dB | -92 dB | .72 dB |

FIG. 6

| CHANNEL NAME | TRANSMITTER CALIBRATION | RECEIVER CALIBRATION | NOISE LEVEL | NOISE-ADJUSTED CALIBRATION VALUE |
|---|---|---|---|---|
| CH #1 | -3 dB | -5 dB | -95 dB | 8 dB |
| CH #2 | -2 dB | -4 dB | -92 dB | 9 dB |
| CH #3 | -3 dB | -3 dB | -90 dB | 11 dB |
| CH #4 | -1 dB | -2 dB | -90 dB | 8 dB |
| CH #5 | 0 dB | -1 dB | -88 dB | 8 dB |
| CH #6 | 0 dB | 0 dB | -86 dB | 9 dB |
| CH #7 | 0 dB | 0 dB | -85 dB | 10 dB |
| CH #8 | -2 dB | -2 dB | -89 dB | 10 dB |
| CH #9 | -2 dB | -2 dB | -90 dB | 4 dB ← SELECTED CHANNEL |
| CH #10 | -3 dB | -2 dB | -84 dB | 16 dB |
| CH #11 | -4 dB | -4 dB | -92 dB | 11 dB |

NOISE-ADJUSTED PERFORMANCE INFO. 710

FIG. 7

RF CHANNEL ANALYSIS AND IMPROVED USAGE OF WIRELESS CHANNELS IN A WIRELESS NETWORK

BACKGROUND

Conventional wireless networks typically include one or more wireless access points to provide mobile communication devices access to a remote network such as the Internet. During operation, conventional wireless access points sometimes implement a channel change algorithm that chooses a best wireless channel on which to communicate. Measured noise can be used as a factor when selecting an appropriate channel to communicate with the mobile communication devices.

In certain instances, a wireless access point can be configured to change wireless channels too often. Unfortunately, excessive wireless channel changes can result in connectivity issues (e.g., lost packets, temporary wireless channel unavailability, etc.) to a corresponding mobile communication device user. Accordingly, in some cases, it has been proposed by certain service providers to disable a channel selection algorithm of a wireless access point to avoid excessive channel changes.

Note that in furtherance of providing more efficient wireless channel changes, the 802.11 specification defines a so-called Channel Switch Announcement (CSA) message. The CSA message is used to initiate a change from using one wireless channel to another. However, many older devices do not listen to or are not able to listen for CSA messages. Channel changes can otherwise cause a pause or cessation of receiving video data. Dropped or lost video data packets are undesirable to the user.

BRIEF DESCRIPTION OF EMBODIMENTS

Embodiments herein provide novel ways of providing improved wireless communications to one or more mobile communication devices.

First Embodiments

In one embodiment, an analyzer resource determines an ability of a wireless access point to wirelessly communicate over each of multiple wireless communication channels in a wireless frequency band. The analyzer resource produces performance information (performance metrics) based on the determined ability or wireless access point to support wireless communications. By way of non-limiting example embodiment, the performance metrics can be configured to indicate the various abilities of the wireless access point to communicate over each of the wireless channels.

The analyzer resource or other suitable resource assigns the performance metrics to a corresponding wireless access point for subsequent use. When operating in the field (such as a wireless network environment), to provide mobile communication devices access to a remote network, the wireless access point uses the assigned performance metrics (and ranking information) as a basis to select amongst multiple available wireless communication channels to communicate in a wireless network environment to one or more mobile communication devices.

In accordance with further embodiments, the performance metrics (such as calibration information) indicate a ranking of the multiple wireless communication channels based on one or more parameters such as transmit power strength of the wireless access point in each of the wireless communication channels, receiver sensitivity, etc. In other words, the performance metrics indicate which of the wireless channels are best used to perform a respective function such as transmit or receive data over a wireless communication link.

In one embodiment, the analyzer resource generates a first performance metric assigned to a first wireless channel of the multiple wireless communication channels; the first performance metric is based on a power level at which the wireless access point is able to transmit wireless communications over the first wireless channel to a mobile computer device. The analyzer resource produces a second performance metric assigned to a second wireless channel of the multiple wireless communication channels; the second performance metric is based on a power level at which the wireless access point is able to transmit wireless communications over the first wireless channel to a mobile computer device.

In accordance with further embodiments, assume that the first performance metric indicates that the wireless access point transmits wireless communications over the first wireless channel (for a given power setting) at a higher transmit power level than over the second wireless channel. In this manner, the performance metrics can indicate a relative capability of the wireless access point to wirelessly communicate in a wireless region over each of multiple different wireless channels.

Additionally or alternatively, embodiments herein can include producing performance metrics to indicate a relative ability of the wireless access point to receive wireless communications over the different available wireless channels from a remote resource. In one embodiment, the relative ability to receive wireless signals as specified by the performance metrics ranks the multiple wireless communication channels based on reception sensitivity of the wireless access point to receive wireless communications over a respective wireless channel.

More specifically, in one embodiment, assume that the analyzer resource produces a first performance metric, the first performance metric being assigned to a first wireless channel of the multiple wireless communication channels; the analyzer resource produces a second performance metric, the second performance metric assigned to a second wireless channel of the multiple wireless communication channels, and so on. Assume that the second performance metric indicates that the wireless access point receives wireless communications over the second wireless channel at a higher receive power level than over the first wireless channel for a given power level of receiving communications over the different wireless channels. In such an embodiment, the performance metrics indicate a relative capability of the wireless access point to receive wireless communications in a wireless region over each of multiple wireless channels.

In accordance with further embodiments, the performance metrics can be configured to indicate a default wireless channel (such as a best wireless channel) in which to select subsequent wireless communications upon initial activation of the wireless access point.

In one embodiment, the performance metrics generated by the analyzer resource may indicate that the wireless access point produces a highest transmit or best power output strength at a first wireless channel of the multiple wireless communication channels; the performance metrics may further indicate that the wireless access point provides a best reception performance at a second wireless channel of the multiple wireless communication channels. Thus, the best transmitter channel may differ from the best receiver channel. Alternatively, as discussed herein, the best wireless transmitter channel may be the same as the best wireless receiver channel.

Second Embodiments

In accordance with second embodiments, the wireless access point can be programmed with performance metrics (such as discussed above) to provide best connectivity in a wireless network environment. For example, in one embodiment, to support wireless communications, a communication manager of the wireless access point is operable to access performance information assigned to the wireless access point. As previously discussed, the performance information indicates a respective capability of the wireless access point to wirelessly communicate over each of multiple wireless channels in a wireless frequency band. The wireless access point processes the performance information to provide best use of the wireless channels. For example, in one embodiment, based on processing of the performance information, the communication manager of the wireless access point selects a particular wireless channel (such as a best ranked wireless channel) of multiple available wireless channels to support communications with respective one or more mobile communication devices in with wireless network environment.

In yet further embodiments, the communication manager of the wireless access point can be configured to process the performance information and, based on the processing, select a particular wireless channel in response to a condition such as activation, initial use, power up, etc. of the wireless access point. In one embodiment, during initialization, the communication manager of the wireless access point selects a default wireless channel as specified by the performance information to support wireless communications.

Further embodiments herein can include selecting a wireless channel based on noise in a wireless network environment. For example, a wireless access point or other suitable resource can be configured to measure RF noise in a wireless region over each of multiple wireless channels. Based at least in part on the measured RF noise levels, and the respective ranking of the wireless channels as indicated by the performance metrics as discussed herein, the communication manager of the wireless access point selects a most suitable wireless channel to support communications to support communications with one or more mobile communication devices.

Additionally or alternatively, note that a wireless channel can be selected based on factors other than just noise. For example, embodiments herein can include selecting the wireless channel based at least in part on channel utilization time of one or more other wireless access points utilizing the wireless channels in the wireless region.

As previously discussed, the performance information (calibration information) assigned to the wireless access point can include information such as performance metrics indicating a ranking of the multiple wireless communication channels based on transmit power strength and/or receive capability of the wireless access point in each of the wireless communication channels.

In accordance with still further embodiments, in a manner as previously discussed, the performance information can include a first performance metric (indicating an ability of the wireless access point to transmit over a first wireless channel) and a second performance metric (indicating an ability of the wireless access point to transmit over a second wireless channel). The communication manager of the wireless access point can be configured to compare the first performance metric and the second performance metric to select a best wireless channel. In one example embodiment, assume that based on such a comparison, the communication manager of the wireless access point selects the first wireless channel in response to detecting that the wireless access point produces a higher power output level via communications over the first wireless channel than the second wireless channel.

In a similar manner, the performance information can include additional performance metrics such as a third performance metric and a fourth performance metric. Assume that the third performance metric is assigned to a first wireless channel of the multiple wireless communication channels; assume that the fourth performance metric is assigned to a second wireless channel of the multiple wireless communication channels. In this example, assume that the fourth performance metric indicates that the wireless access point has a better receiver sensitivity to receive wireless communications over the second wireless channel than over the first wireless channel. In such an instance, the communication manager of the wireless access point can be configured to select the second wireless channel to support receipt of communications in a wireless network environment because it provides the best receive capability.

As previously discussed, if desired, the performance information can be configured to indicate a default wireless channel to support wireless communications. Selection of a wireless channel can include selecting the default wireless channel to support communications in the wireless network environment via the wireless access point.

Further embodiments herein can include tracking a history of which of multiple wireless channels provides a best performance. During initialization of the wireless access point, the wireless access point can be configured to select the historically best wireless channel to communicate (transmit or receive data) with one or more mobile communication devices.

In accordance with further embodiments, the communication manager of the wireless access point can be configured to initially select a first wireless channel to support communications. As a background task, the wireless access point or other suitable resource measures noise present in the wireless region over each of the multiple wireless channels. In response to detecting non-use of the wireless access point for an amount of time greater than a threshold amount of time, the wireless access point selects a second wireless channel of the multiple wireless channels. In one embodiment, the second wireless channel selected based on a combination of performance information and the measured noise.

Additionally or alternatively, the wireless access point can be configured to measure power levels of noise in the wireless region over each of the multiple available wireless channels. In response to detecting an event or condition indicating wireless interference over the first wireless channel above an interference threshold value, the wireless access point can be configured to select a second wireless channel of the multiple wireless channels to communicate in the wireless region instead of using a previously selected first wireless channel (such as selected at initialization of the wireless access point). In one embodiment, the second wireless channel is selected based at least in part on the measured level (magnitude) of noise detected in the multiple wireless channels.

Third Embodiments

In accordance with third embodiments, assume that a wireless access point initially communicates over a first wireless channel in a wireless region. The wireless access point selects the first wireless channel from multiple wireless channels available to support wireless communications. As a background task, the wireless access point monitors the wireless region for presence of noise over each of the multiple wireless channels. In response to detecting an event or condition indicating wireless interference over the first wireless channel above an interference threshold value, the wireless access point switches over to use of a second wireless channel of the multiple wireless channels to communicate in the wireless region.

In one embodiment, the second wireless channel is selected based at least in part on identified levels of noise detected in the multiple wireless channels during the monitoring. For example, in one embodiment, to support more reliable communications between the wireless access point and the one or more mobile computer devices, the wireless access point switches over to use of the second wireless channel in response to detecting (a condition such as) a lower level of background noise present on the second wireless channel than a background noise detected on a first wireless channel.

In accordance with yet further embodiments, monitoring the wireless region for the presence of noise can include: producing and storing noise metrics indicating levels of noise detected over each of the multiple wireless channels while configured to use the first wireless channel to communicate in the wireless region. Additionally or alternatively, monitoring the wireless region for presence of noise over each of the multiple wireless channels includes: measuring a power level of the noise as a background task with respect to supporting communications over the first wireless channel the wireless region.

If desired, the wireless access point can be configured to measure the power level of the noise while the wireless access point is in a standby mode in which the wireless access point does not transmit wireless communications.

Fourth Embodiments

In accordance with still further embodiments, a wireless access point is assigned performance information in a manner as previously discussed. The performance information indicates different performance capabilities of the wireless access point to wirelessly communicate over each of multiple wireless channels in a wireless frequency band (spectrum). In addition to assignment of the performance information (performance metrics), the wireless access point measures power levels of noise in the wireless region over each of the multiple wireless channels to determine best channel usage. For example, in one embodiment, the wireless access point analyzes a combination of assigned performance information in view of the measured power levels of noise in each of the wireless channels. Based on the analysis of the performance information and detected noise, the wireless access point selects a wireless channel of the multiple wireless channels to communicate in the wireless region.

In one embodiment, analyzing the combination of the performance information in view of the measured power levels of noise at the communication manager of the wireless access point includes: retrieving a first performance metric from the performance information, the first performance metric indicating a relative ability of the wireless access point to communicate over the first wireless channel; adjusting the first performance metric based at least in part on a measured power level of noise in the first wireless channel; retrieving a second performance metric from the performance information, the second performance metric indicating a relative ability of the wireless access point to communicate over the second wireless channel; and adjusting the second performance metric based at least in part on a measured power level of noise in the second wireless channel.

In accordance with further embodiments, the communication manager of the wireless access point compares noise-adjusted performance metrics amongst each other to select a best wireless channel to transmit or receive. For example, in one embodiment, the communication management resource compares the first adjusted performance metric to the second adjusted performance metric; and selects the wireless channel based on the comparison.

As previously discussed, access point vendors typically employ channel change algorithms that select a wireless channel in which there is a least mat of wireless interference. They do not take advantage of selecting a best physical channel when determining a channel change as discussed herein. Conventional residential WiFi™ routers or access points employ poor channel change algorithms. For example, they are configured to select a channel only during boot up and are prevented from changing channels thereafter to avoid connectivity issues.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless channel selection and use. The instructions, when executed by computer processor hardware, cause the computer processor hardware (such as one or more co-located or disparately processor devices) to: determine an ability of a wireless access point to wirelessly communicate over each of multiple wireless communication channels in a wireless frequency band; produce performance metrics based on the determined ability; and assign the performance metrics to the wireless access point, the wireless access point operable to implement the performance metrics to select amongst the multiple wireless communication channels to communicate in a wireless network environment.

Another embodiment herein includes a computer readable storage medium and/or system having instructions stored thereon to facilitate wireless channel selection and use. The instructions, when executed by computer processor hardware, cause the computer processor hardware (such as one or more co-located or disparately processor devices) to: access performance information assigned to a wireless access point, the performance information indicating a respective capability of the wireless access point to wirelessly communicate over each of multiple wireless channels in a wireless frequency band; process the performance information; and based on processing of the performance information, select a wireless channel to support communications with the wireless access point in a wireless network environment.

Another embodiment includes a computer readable storage medium and/or system having instructions stored thereon to facilitate wireless channel selection and use. The instructions, when executed by computer processor hardware, cause the computer processor hardware (such as one or more co-located or disparately processor devices) to: communicate over a first wireless channel in a wireless region from a wireless access point, the first wireless channel selected from multiple wireless channels available to support wireless communications; monitor the wireless region for presence of noise over each of the multiple wireless channels; and in response to detecting an event indicating wireless interference over the first wireless channel above an interference threshold value, switch over to use of a second wireless channel of the multiple wireless channels to communicate in the wireless region, the second wireless channel selected based on identified levels of noise detected in the multiple wireless channels during the monitoring of the wireless region for presence of noise.

Yet another embodiment herein includes a computer readable storage medium and/or system having instructions stored thereon to facilitate wireless channel selection and use. The instructions, when executed by computer processor hardware, cause the computer processor hardware (such as one or more co-located or disparately processor devices) to: receive performance information assigned to a wireless access point, the performance information indicating different performance capabilities of the wireless access point to wirelessly communicate over each of multiple wireless channels in a wireless frequency band; measure power levels of noise in the wireless region over each of the multiple wireless channels; analyze a combination of the performance information in view of the measured power levels of noise; and based on the analysis, select a wireless channel of the multiple wireless channels to communicate in the wireless region.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 4 is an example diagram illustrating generation of performance information and corresponding performance metrics according to embodiments herein.

FIG. 6 is an example diagram illustrating generation and use of noise-adjusted performance information and corresponding metrics for a transmitter of a wireless access point according to embodiments herein.

FIG. 7 is an example diagram illustrating generation of noise-adjusted performance information and corresponding performance metrics for a transmitter/receiver of a wireless access point according to embodiments herein.

Figure 1:
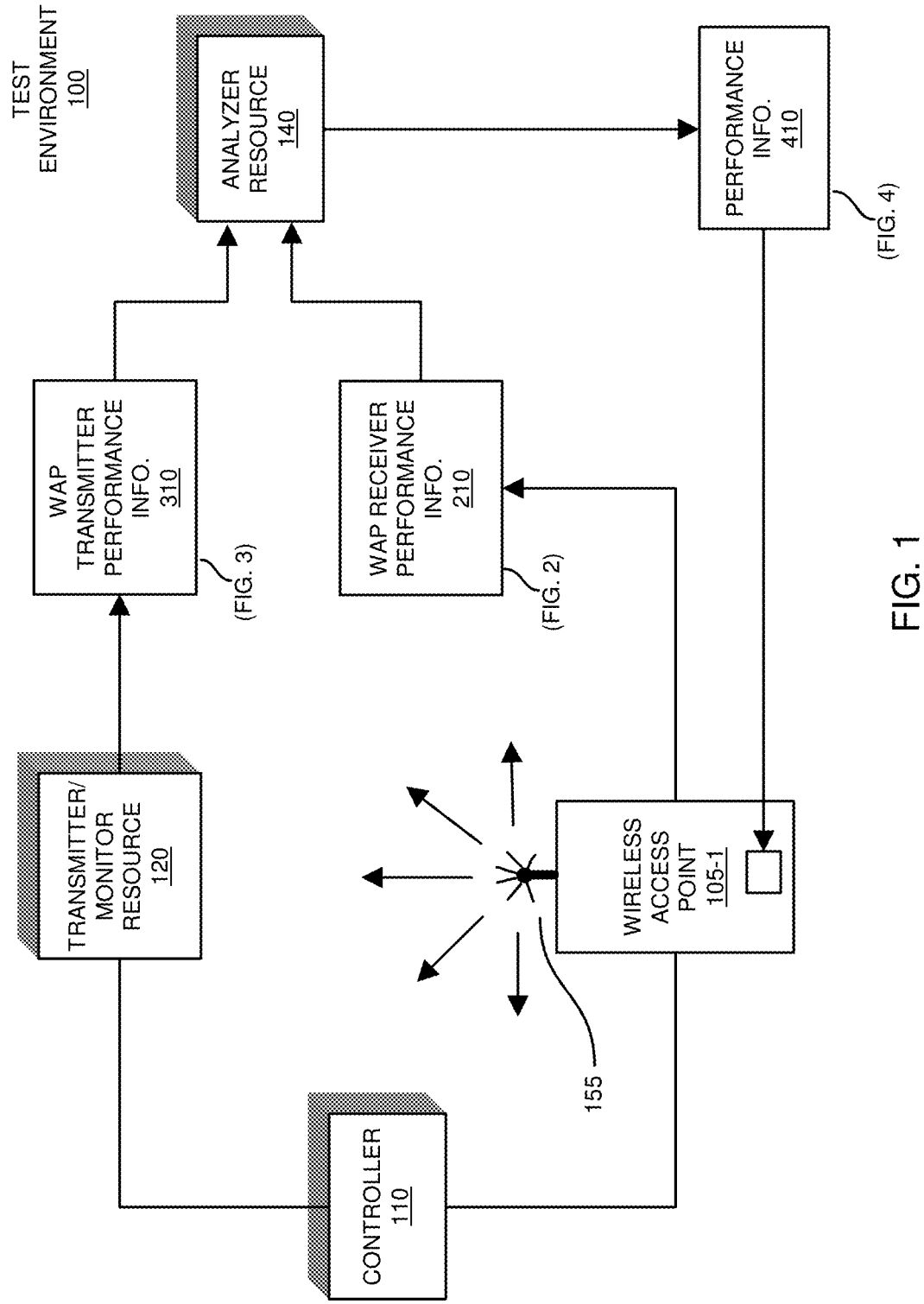
FIG. 1 is an example diagram illustrating a wireless network environment and testing of a wireless access point according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, an analyzer resource receives information indicating a calculated or measured ability of a wireless access point to wirelessly communicate (such as transmit and receive) over each of multiple available wireless communication channels in a wireless frequency band. The analyzer resource produces performance information (performance/calibration metrics) based on a respective measured transmit and/or receive capability of each of the wireless channels. The analyzer resource or other suitable resource assigns the performance metrics to the wireless access point. When operating in the field (such as a wireless network environment), to provide one or more mobile communication devices access to a remote network, the wireless access point uses the assigned performance metrics (calibration information) as a basis to select amongst multiple available wireless communication channels to communicate in a wireless network environment. These and other communication management techniques are disclosed herein.

Now, more specifically, FIG. 1 is an example diagram illustrating generation of performance information (such as calibration information) according to embodiments herein.

As shown, wireless test environment 100 includes a wireless access point 105-1 (wireless access point under test), controller 110, transmitter/monitor resource 120, and analyzer resource 140. In general, the transmitter/monitor resource 120 operates in conjunction with the wireless access point 105-1 to produce respective receiver performance information 210 and transmitter performance information 310.

More specifically, with reference to the test environment 100 of FIG. 1, to determine a capability of the wireless access point 105-1 to receive communications at each of multiple different wireless channels (such as wireless channels 1 through 11), the controller 110 notifies the transmitter/receiver resource 120 to individually transmit wireless signals in the test environment 100 over each of the multiple available wireless channels at different times. The controller 110 controls the wireless access point 105-1 to monitor for any received wireless communications from the transmitter/monitor resource 120. Based on a detected power level of receiving the transmitted communications from the transmitter/monitor resource 120, the wireless access point 105-1 outputs receiver performance information 210.

Figure 2:
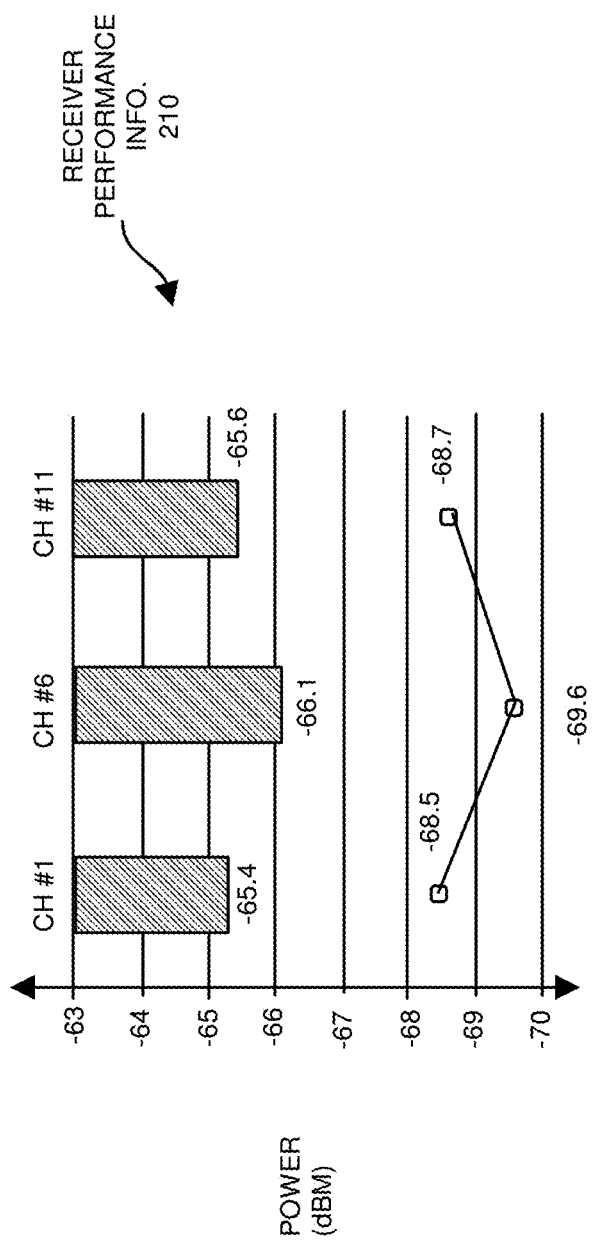
FIG. 2 is an example diagram illustrating receiver performance information according to embodiments herein.

FIG. 2 is an example diagram illustrating receiver performance information according to embodiments herein.

As shown, to test a capability of the wireless access point 105-1 to receive communications on channel #1 (such as a wireless channel of a 2.4 GHz spectrum), the controller 110 notifies the transmitter/monitor resource 120 (in FIG. 1) to transmit first wireless communications in the test environment 100 at a frequency corresponding to channel #1 and at a given power level. The controller 110 notifies the wireless access point 105-1 to monitor a signal strength at which the first wireless communications from the transmitter/monitor resource 120 are received at antenna system 155 (such as including hardware, circuitry, software, etc.) of the wireless access point 105-1. Based on the monitoring, the wireless access point 105-1 generates and records a performance metric such as total isotropic sensitivity (TIS) of antenna system 155 as being −65.4 dBm for channel #1 at the given power level. Further, in this example, the wireless access point 105-1 generates a minimum effective isotropic sensitivity (EIS) of antenna system 155 as being −68.5 dBm for wireless channel #1.

As further shown, to test a capability of the wireless access point 105-1 to receive communications on channel #6 (such as a wireless channel of a 2.4 GHz spectrum), the controller 110 notifies the transmitter/monitor resource 120 to transmit second wireless communications in the test environment 100 at a frequency corresponding to channel #6 and at the given (same) power level. The controller 110 notifies the wireless access point 105-1 to monitor a signal strength at which the second wireless communications from the transmitter/monitor resource 120 are received at antenna system 155 of the wireless access point 105-1. Based on the monitoring, the wireless access point 105-1 generates and records a performance metric such as total isotropic sensitivity (TIS) of antenna system 155 as being −66.1 dBm for channel #6 at the given power level. Further, in this example, the wireless access point 105-1 generates a minimum effective isotropic sensitivity (EIS) of antenna system 155 as being −69.6 dBm for channel #6.

As further shown, to test a capability of the wireless access point 105-1 to receive communications on channel #11 (such as a wireless channel of a 2.4 GHz spectrum), the controller 110 notifies the transmitter/monitor resource 120 to transmit third wireless communications in the test environment 100 at a frequency corresponding to channel #11 and at a given selected power level. The controller 110 notifies the wireless access point 105-1 to monitor a signal strength at which the third wireless communications from the transmitter/monitor resource 120 are received at antenna system 155 of the wireless access point 105-1 over channel #11. Based on the monitoring, the wireless access point 105-1 generates and records a performance metric such as total isotropic sensitivity (TIS) of antenna system 155 as being −65.6 dBm for channel #11 at the given power level. Further, in this example, the wireless access point 105-1 generates a minimum effective isotropic sensitivity (EIS) of antenna system 155 as being −68.7 dBm for channel #11.

In this manner, embodiments herein include testing an ability of the wireless access point 105-1 to receive communications over different channels (frequencies) that were transmitted at the same transmit power level. In general, the performance information 210 in FIG. 2 indicates that the wireless access point 105-1 is better at receiving communications over certain frequencies (such as wireless channel #6 in this example) than others (such as wireless channels #1 and #11).

Referring again to FIG. 1, to determine a performance capability of the wireless access point 105-1 to transmit at each of multiple different wireless channels (such as wireless channels 1 through 11), the controller 110 controls the wireless access point 105-1 to individually transmit wireless signals in the test environment 100 over each of the multiple available wireless channels at different times. The controller 110 controls the transmitter/monitor resource 120 to monitor the test environment 100 for the transmitted communications. Based on a detected power level of receiving the communications transmitted from the wireless access point 105-1, the transmitter/monitor resource 120 produces transmitter performance information 310 (FIG. 3) associated with wireless access point 105-1.

Figure 3:
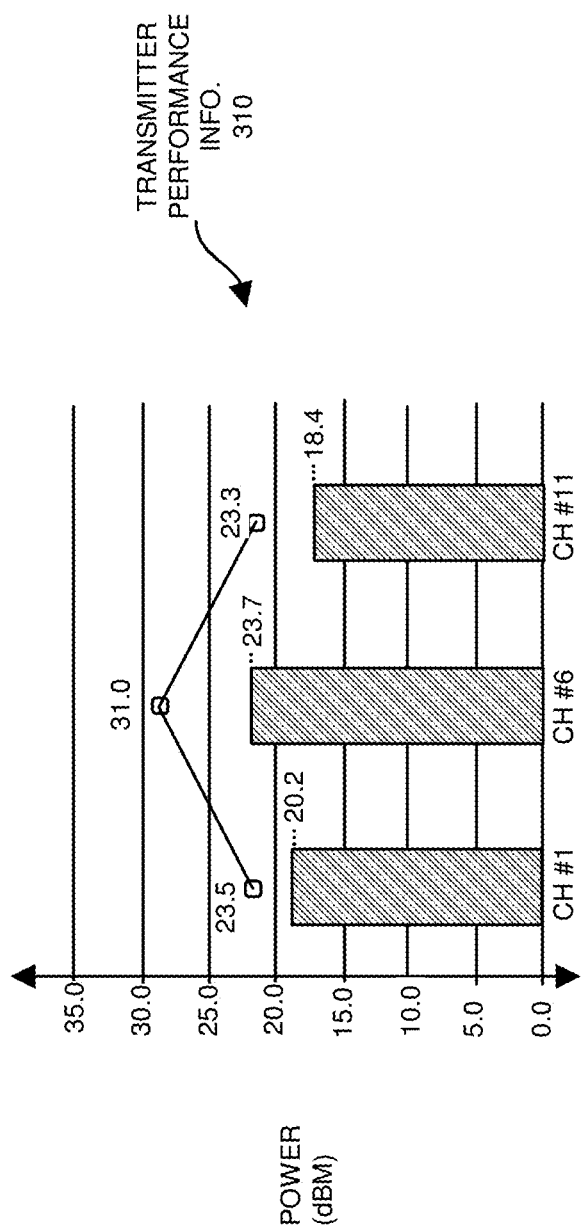
FIG. 3 is an example diagram illustrating transmitter performance information according to embodiments herein.

More specifically, FIG. 3 is an example diagram illustrating transmitter performance information according to embodiments herein.

As shown, to test a capability of the wireless access point 105-1 to transmit wireless communications on channel #1 (such as a wireless channel of a 2.4 GHz spectrum allocated to support wireless communications), the controller 110 notifies the wireless access point 105-1 to transmit first wireless communications in the test environment 100 at a frequency corresponding to channel #1 and at a given power level. The transmitter/monitor resource 120 monitors a signal strength at which the first wireless communications from the wireless access point 105-1 are received at the transmitter/monitor resource 120. In this example, the transmitter/monitor resource 120 records a performance metric such as total radiated power (TRP) of antenna system 155 over wireless channel #1 as being 20.2 dBm for the given power level. Further, in this example, the transmitter/monitor resource 120 produces a peak effective radiated isotropic power (EIRP) value associated with antenna system 155 as being 23.5 dBm for channel #1 based on received wireless communications.

To test a capability of the wireless access point 105-1 to transmit wireless communications on channel #6 (such as a wireless channel of a 2.4 GHz spectrum allocated to support wireless communications), the controller 110 notifies the wireless access point 105-1 to transmit second wireless communications in the test environment 100 at a frequency corresponding to channel #6 and at the given power level (same for wireless channel #1) at the given signal strength. The transmitter/monitor resource 120 monitors a signal strength at which the second wireless communications from the wireless access point 105-1 are received at the transmitter/monitor resource 120. The transmitter/monitor resource 120 records a performance metric such as total radiated power (TRP) of antenna system 155 over wireless channel #6 as being 23.7 dBm for the given power level. Further, in this example, the transmitter/monitor resource 120 produces a peak effective radiated isotropic power (EIRP) value associated with antenna system 155 as being 31.0 dBm for channel #6 based on the received wireless communications.

To test a capability of the wireless access point 105-1 to transmit wireless communications on channel #11 (such as a wireless channel of a 2.4 GHz spectrum allocated to support wireless communications), the controller 110 notifies the wireless access point 105-1 to transmit third wireless communications in the test environment 100 at a frequency corresponding to channel #11 and at the chosen given power level (same as power level above). The transmitter/monitor resource 120 monitors a signal strength at which the third wireless communications from the wireless access point 105-1 are received at the transmitter/monitor resource 120. In this example, assume that the transmitter/monitor resource 120 records a performance metric such as total radiated power (TRP) of antenna system 155 over wireless channel #11 as being 18.4 dBm for the given power level. Further, in this example, the transmitter/monitor resource 120 produces a peak effective radiated isotropic power (EIRP) value associated with antenna system 155 as being 23.3 dBm for channel #11 based on the received wireless communication.

In this and a similar manner, embodiments herein include testing an ability of the wireless access point 105-1 to transmit communications over each of channels 1-11 (different frequencies) at the same selected power level. The performance information 310 in FIG. 3 indicates that the wireless access point 105-1 is better at transmitting wireless communications over certain frequencies (such as channel #6) than others (such as channels #1 and #11).

Referring again to FIG. 1, the analyzer resource 140 uses the transmitter performance information 310 and the receiver performance information 210 to generate performance information 410 (such as calibration information) for subsequent use by the wireless access point 105-1 to provide more robust communications with respective one or more mobile communication devices.

An example of the performance information 410 generated by the analyzer resource 140 is further shown in FIG. 4. As shown, the performance information 410 in FIG. 4 includes transmit/receive performance metrics for each wireless channel. As previously discussed, the performance metrics indicate a relative ability of the wireless access point 105-1 to receive and transmit communications with respect to other channels.

More specifically, as indicated by the performance information 410, channel #6 is assigned a transmit calibration value (performance metric) of 0 dB. This means that the wireless access point 105-1 transmits, for the given power level, at a desired output power level without losses.

As further indicated by the performance information 410, the channel #6 is assigned a receive sensitivity calibration value (performance metric) of 0 dB. This means that the wireless access point 105-1 is able to receive wireless communications at a desired power level without losses.

As indicated by the performance information 410, channel #1 is assigned a transmit calibration value (performance metric) of −3 dB. This means that the wireless access point 105-1 actually transmits wireless signals at a desired output power level 3 dB below the baseline power level for transmitting. For example, if the wireless access point 105-1 is operated to transmit wireless communications at 20 dB, the wireless access point 105-1 actually only transmits at a power level of 17 dB rather than 20 dB for channel #1 due to transmitter circuit inaccuracies, errors, physical device imperfections, etc., associated with the antenna system 155 and corresponding transmitter circuitry.

As further indicated by the performance information 410, the channel #1 is assigned a receive sensitivity calibration value (performance metric) of −3 dB. This means that an actual −65 dB signal received at the wireless access point 105-1 appears to be received at only a −68 dB level due to receiver circuit inaccuracies, errors, physical device imperfections, etc., associated with the antenna system 155 and corresponding receiver circuitry.

As indicated by the performance information 410, channel #11 is assigned a transmit calibration value (performance metric) of −4 dB. This means that the wireless access point 105-1 actually transmits at a desired output power level 4 dB below a given power level when transmitting. For example, if the wireless access point 105-1 is programmed to transmit wireless communications at 20 dB, due to circuit losses and/or antenna imperfections, the wireless access point 105-1 actually only transmits at 16 dB from antenna device 155 rather than 20 dB.

As further indicated by the performance information 410, the channel #1 is assigned a receive sensitivity calibration value (performance metric) of −4 dB. This means that an actual −65 dB signal received at the wireless access point 105-1 appears to be only a −69 dB signal due to losses associated with the antenna device 155.

Note that as an alternative to physically measuring a performance capability of the wireless access point 105 to transmit and receive wireless communications, non-empirical methods (such as based on computer simulation analysis)

can be used to identify transmitter and receiver losses associated with antenna device 155 to determine respective performance capabilities of a particular wireless access point design.

Additionally, note that embodiments herein can include measuring and/or calculating performance characteristics associated with a particular wireless access point design and applying or assigning the calculated performance metrics to each of the wireless access point of the same type because they are known to operate in a similar imperfect manner.

Thus, according to embodiments herein, analyzer resource 140 determines an ability of a wireless access point 105-1 to wirelessly communicate over each of multiple wireless communication channels in a wireless frequency band. The analyzer resource 140 produces performance information 410 (including performance metrics) based on the determined ability to communicate. The analyzer resource 140 (or other suitable entity) assigns the performance metrics (performance information 410) to the wireless access point 105-1. When operating in the field (such as in a wireless network environment), to provide mobile communication devices access to a remote network, the wireless access point 105-1 uses the assigned performance information 410 and metrics as a basis to select amongst multiple available wireless communication channels to communicate in a wireless network environment to one or more mobile communication devices.

In accordance with further embodiments, the analyzer resource 140 can be configured to produce the performance metrics (such as calibration information) to indicate a ranking of the multiple wireless communication channels based on transmit power strength of the wireless access point in each of the wireless communication channels. In one embodiment, channel #6 can be marked as being the default channel (highest ranked channel) because it provides the best overall wireless transmit and receive capability with respect to other available wireless channels such as wireless channel #1 and wireless channel #11.

As further shown by FIG. 4, the analyzer resource 140 generates a first performance metric (transmit calibration value=0 dB) for wireless channel #6; as previously discussed, this first performance metric is based on a power level at which the wireless access point 105-1 actually transmits, for the given power setting, wireless communications over the first wireless channel to a mobile computer device over wireless channel #6.

Further, the analyzer resource 140 produces a performance metric (transmit calibration value equal to −3 dB) for wireless channel #1; this performance metric is based on a power level at which the wireless access point 105-1 actually transmits wireless communications over the wireless channel #1 to a mobile computer device. The first performance metric (0 dB for channel #6) indicates that the wireless access point transmits wireless communications over the wireless channel #6 at a higher transmit power level (of 3 dB) than over the wireless channel #1. In this manner, the performance information 410 indicates a relative capability of the wireless access point 105-1 to wirelessly communicate in a region over each of multiple different wireless channels.

In accordance with a ranking of the channels as indicated by the performance metrics in performance information 410, the wireless access point 105-1 provides highest relative transmitter output power over wireless channels #5 through 8; the wireless access point 105-1 provides next highest relative transmitter output power for a given baseline setting over wireless channel #4; the wireless access point 105-1 provides next highest relative transmitter output power over wireless channel #3 and #9; the wireless access point 105-1 provides next highest relative transmitter output power over wireless channels #1, 2 and #10; the wireless access point 105-1 provides the lowest relative transmitter output power over wireless channels #11.

In a similar manner, the performance information 410 and corresponding metrics indicate a relative ability (or ranking) of the wireless access point 105-1 to receive wireless communications over the different available wireless channels. The relative ability as specified by the performance metrics (such as receiver calibration=0 dB, −1 dB, −2 dB, etc.) indicates a ranking of the multiple wireless communication channels based on reception sensitivity of the wireless access point to receive wireless communications over each of the multiple wireless communication channels.

For example, the wireless access point 105-1 has highest (best) receiver sensitivity over wireless channels #5 through #7 (in which performance metrics=0 dB); the wireless access point 105-1 has next highest receiver sensitivity over wireless channel #4; the wireless access point 105-1 has next highest receiver sensitivity over wireless channels #2, 3, 8, and 9; the wireless access point 105-1 has next highest receiver sensitivity over wireless channels #1, and #10; the wireless access point 105-1 has the lowest receiver sensitivity over wireless channel #11 (−4 dB).

Thus, the performance information 410 and corresponding metrics generated by the analyzer resource 140 indicate that the wireless access point 105-1 provides a highest relative transmit power output strength at wireless channel #6; the performance information 410 further indicates that the wireless access point 105-1 provides a best reception performance at wireless channel #6 of the multiple wireless communication channels 1-11.

In accordance with further embodiments, for a given power output level, the performance information 410 can be configured to indicate that the wireless access point 105-1 produces a highest transmit power output strength over a first wireless channel; the performance information 410 can be configured to indicate that the wireless access point 105-1 provides a best receiver performance of receiving wireless communications at a second wireless channel. Thus, it may not be the case that the same wireless channel provides best reception and transmit capability.

Figure 5:
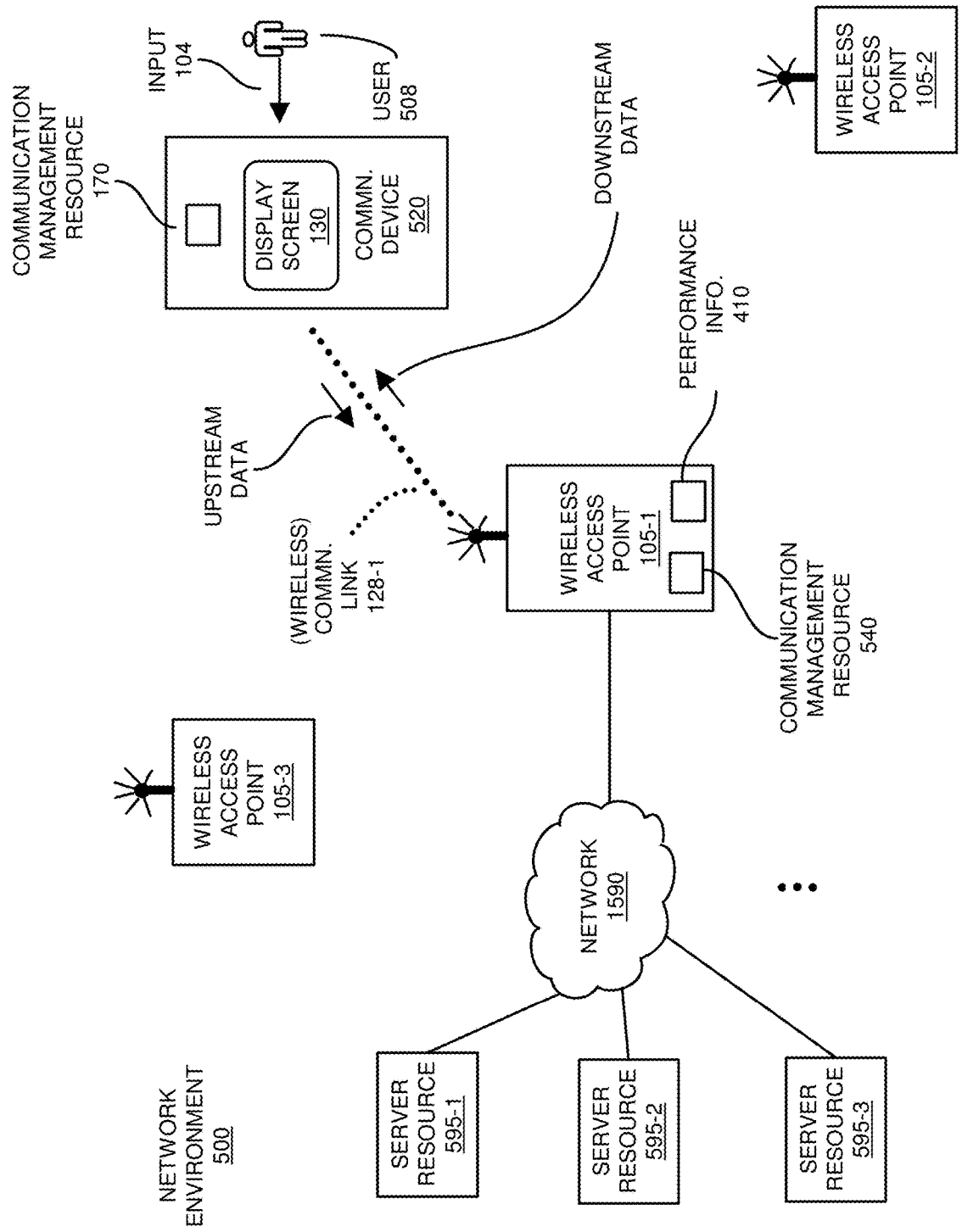
FIG. 5 is an example diagram illustrating a wireless access point and corresponding communication management resource that uses performance information to manage use of wireless channels in a wireless network environment according to embodiments herein.

FIG. 5 is an example diagram illustrating a wireless access point programmed with performance information according to embodiments herein.

As shown, the network environment 500 includes communication device 520-1 (one of multiple mobile communication devices in network environment 500), wireless access point 105-1, network 590, server resource 595-1, server resource 595-2, and server resource 595-3. In one embodiment, wireless access point 105-1 is one of multiple other wireless access points 105-2, 105-3, etc., operating in network environment 500.

In accordance with further embodiments, the wireless access point 105-1 provides the communication device 520-1 access to server resources 595 (server resource 595-1, server resource 595-2, server resource 595-3, etc.) via network 590. For example, in an upstream direction, the communication device 520 conveys communications over wireless communication link 128-1 to the wireless access point 105-1; wireless access point 105-1 forwards the communications over network 590 to an appropriate server resource. In a downstream direction, the server resources communicate over network 590 to the wireless access point 105-1; wireless access point transmits the communications over wireless communication link 128-1 to the communication device 520.

In accordance with further embodiments, the wireless access point 105-1 competes for use of wireless channels also used by other wireless access points (such as wireless access point 105-2, wireless access point 105-3, etc.) operating in the network environment 500.

In one embodiment, as previously discussed, the wireless access point 105-1 is programmed with the performance information 410 and corresponding performance metrics (calibration information) to provide efficient connectivity in a wireless network environment 540.

For example, in one embodiment, during operation, a communication management resource 540 of the wireless access point 105-1 accesses performance information 410 assigned to a wireless access point 105-1. As previously discussed, the performance information 410 indicates respective capabilities of the wireless access point 105-1 to wirelessly communicate over each of multiple wireless channels #1-11 in a wireless frequency band such as around 2.4 GHz, 5 GHz, etc. The communication management resource uses the performance information 410 to determine a best of one or more wireless channels to use to communicate in network environment 500.

Note that embodiments herein can include generating performance information 410 for each of multiple frequencies (such as 2.4 GHz, 5 GHz, etc.) and storing the information in the wireless access point 105-1 for each band.

Additionally, note that the performance metrics in performance information 410 may indicate that the wireless access point 105-1 is able to best communicate over a first wireless channel while the wireless access point 105-1 is able to best receive communications over a second wireless channel. In such an instance, if desired, the wireless access point 105-1 can be configured to use the first wireless channel to support a downlink of data over wireless communication link 128-1 to the mobile communication device 520; the wireless access point 105-1 can be configured to select the second wireless channel to support an uplink of data over the wireless communication link 128-1 from the mobile communication device 520 to the wireless access point 105-1.

Based on processing of the performance information 410, the communication management resource 540 of the wireless access point 105-1 selects a particular wireless channel of multiple available wireless channels to support communications with a respective mobile computer device 520 operated by user 508. In other words, when selecting a particular channel in which to communicate with the communication device 520, the wireless access point 105-1 makes a selection of the wireless channel taking into account relative performances as indicated by the performance information 410.

In this example embodiment, assuming no noise or equal noise across all channels, the wireless channel #6 is identified as being the best transmitter/receiver channel. In one embodiment, upon power up of the wireless access point 105-1, the communication management resource 540 selects the wireless channel #6 (default channel) to support communications in the network environment 500.

Further embodiments herein include, via the wireless access point 105-1 or other suitable resource, measuring RF noise in a wireless region over each of multiple wireless channels 1-11 and taking noise into account when selecting a wireless channel. More specifically, based on the measured RF noise levels and performance metrics (performance information 410) assigned to the wireless access point 105-1, the communication management resource 540 of the wireless access point 105-1 selects a wireless channel to support wireless communications.

More specifically, assuming that the noise interference level is equal amongst each of the wireless channels 1-11 in the network environment 500 at the wireless access point 105-1, the communication management resource 540 selects amongst wireless channels #5 through #8 (because these are the best wireless channels as indicated by performance information 410) to support communications in the network environment 500.

Additionally or alternatively, note that a wireless channel can be selected based on one or more other factors. For example, the wireless access point 105-1 can be configured to select a wireless channel for use based at least in part on channel utilization time by one or more other wireless access points utilizing the wireless channels in the wireless network environment 500 (wireless region). In one embodiment, the wireless access point 105-1 monitors the wireless spectrum to determine channel utilization time. If utilization time is low for a given wireless channel, that channel is a more desirable channel to select for communications between the wireless access point 105-1 and the mobile communication device 520.

In accordance with further embodiments, the communication management resource 540 of the wireless access point 105-1 can be configured to compare a first transmit performance metric (such as 0 dB for transmitting over a wireless channel #6) and a second transmit performance metric (such as −3 dB for transmitting over wireless channel #1). The communication management resource 540 can be configured to compare all performance metrics with each other to select a best wireless channel. Based on the comparison, the communication manager of the wireless access point 105-1 selects the wireless channel #6 to transmit communications from the wireless access point 105-1 in response to detecting that the wireless access point 105-1 produces a higher power output level (3 dB higher) for communications over the wireless channel #6 than over the wireless channel #1.

In a similar manner, assume that the performance information 410 indicates that the wireless access point 105-1 has a better receiver sensitivity to receive wireless communications over the first wireless channel than over the second wireless channel. In such an instance, the communication management resource 540 of the wireless access point 105-1 selects the first wireless channel to receive communications in a wireless network environment.

In accordance with further embodiments, the communication management resource 540 of the wireless access point 105-1 can be configured to initially select use a first wireless channel (such as wireless channel #6) to support wireless communications with one or more communication devices in network environment 500. The wireless access point 105-1 can be configured to measure noise present in the wireless region over each of the multiple wireless channels. In response to detecting a condition such as non-use of the wireless access point for an amount of time greater than a threshold amount of time, the wireless access point 105-1 can be configured to select a second wireless channel of the multiple wireless channels to support communications instead of the first wireless channel. In one embodiment, the second wireless channel is selected based on a combination of performance information 410 and the measured noise in each channel as further described herein.

Additionally or alternatively, note that the wireless access point 105-1 can be configured to measure power levels of noise present in the wireless region (network environment 500) over each of the multiple available wireless channels. In response to detecting an event indicating wireless interference over a first wireless channel above an interference threshold value, the wireless access point 105-1 selects a second wireless channel of the multiple wireless channels to communicate in the wireless region to communication device 520 instead of using a previously selected first wireless channel to communicate with the mobile communication device 520. In one embodiment, the second wireless channel is selected based on: i) the measured level of noise detected in the multiple wireless channels, and/or ii) performance information 410.

In accordance with yet further embodiments, the communication management resource 540 of the wireless access point 105-1 is configured to track performance of communicating with one or more mobile communication devices over a first selected wireless channel such as wireless channel #6. Assume that the communication management resource 540 of the wireless access point 105-1 switches to use of a second wireless channel such as wireless channel #1 because RF noise in the network environment 500 in the wireless channel #6 results in poor communication bandwidth between the wireless access point 105-1 in the mobile communication device 520. Subsequent to the switchover, the wireless access point 105-1 tracks performance of communicating with the one or more mobile communication devices over the second wireless channel to determine if communications over the second wireless channel are acceptable for one or more corresponding mobile communication devices. Accordingly, the wireless access point 105-1 or other suitable resource can be configured to monitor usage amongst different wireless channels.

If desired, subsequent to switching from use of a first wireless channel to use of a second wireless channel, the communication management resource 105-1 can be configured to verify that each of the respective wireless communication links between the wireless access point and the one or more mobile communication devices supports communications above a performance threshold value. This verification ensures that switchover to the second wireless channel provides an appropriate level of quality of communications between the wireless access point 105-1 and the one or more communication devices. If the communication management resource 540 or other suitable resource detects that one or more mobile communication device experiences poor communications based on the second wireless channel, the communication management resource 540 potentially switches to yet another wireless channel.

Selection of Wireless Channel based at Least in Part on Detected Interference

In accordance with third embodiments, the wireless access point 105-1 can be configured to operate in a relatively fast wireless channel-changing mode. For example, if interference (wireless noise) is detected as being severe, such as because a beacon announcement cannot be sent from the wireless access point 105-1 for a timeout period, the wireless access point 105-1 switches to use of an historically best wireless channel regardless of traffic. In one embodiment, the historically best channel is the wireless channel providing the least amount of wireless interference as measured during unobtrusive background scanning.

More specifically, assume that the wireless access point 105-1 communicates over a first wireless channel in wireless network environment 500. As previously discussed, the wireless access point 120-1 selects the first wireless channel from amongst multiple wireless channels available to support wireless communications. The wireless access point 105-1 can be configured to monitor the wireless region for presence of noise over each of the multiple wireless channels #1-11. In response to detecting an event indicating wireless interference over the initially selected first wireless channel above an interference threshold value, the wireless access point 105-1 switches over to use of a second wireless channel (such as the historically best channel that has the least amount of interference as measured during unobtrusive noise-background scanning) of the multiple wireless channels to communicate with the mobile communication device. Accordingly, the second wireless channel can be selected based at least in part on identified levels of noise detected in the network environment 500.

Note that an event indicating interference can be any type of event. In one embodiment, detecting the event indicating wireless interference can include: detecting a performance degradation of an ability to communicate over the first wireless channel to communication devices in the wireless region. To support more reliable communications between the wireless access point and the one or more mobile computer devices, in one embodiment, the wireless access point 105-1 switches over to use of the second wireless channel in response to detecting a lower level of background noise present on the second wireless channel than a background noise detected on a first wireless channel.

In accordance with further embodiments, monitoring of a wireless region (such as network environment 500) for the presence of noise can include: producing and storing noise metrics indicating levels of noise detected over each of the multiple wireless channels while configured to use the first wireless channel to communicate in the wireless region. Additionally or alternatively, monitoring the wireless region for presence of noise over each of the multiple wireless channels can include: measuring a power level of the noise as a background task with respect to supporting communications over the first wireless channel in the wireless region.

If desired, the wireless access point 105-1 can be configured to measure the power level of the noise while the wireless access point 105-1 is in a standby mode in which the wireless access point 105-1 does not transmit wireless communications.

In accordance with further embodiments, the wireless access point 105-1 can operate in an exploratory mode in which the communication management resource 540 performs slow channel adjustment.

In the exploratory mode, if the wireless access point 105-1 detects that there has not been any traffic within a quiet period such as N seconds (such as N=3600 seconds or other suitable value), the communication management resource 540 of wireless access point 105-1 analyzes the noise-adjusted performance information 610 to identify a best channel on which to support communications. If the channels are within the calibration table difference in which the default channel is still the best choice to support communications, the communication management resource 540 continues to use the default wireless channel #6 to support wireless communications in wireless network environment 500. Alternatively, assuming approximately equal noise amongst the wireless channels, the communication management resource 540 can be configured to select a best channel (such as wireless channel #6) based on performance information 410.

If further desired, when changing from one wireless channel to another, the wireless access point 105-1 can be configured to select a historically best communication channel in which to support wireless communications in the network environment 500. For example, as previously discussed, the wireless access point can be configured to keep track of which of one or more of the wireless channels #1-11 provides best support for wireless communications. If desired, the historically best channels can be ranked to indicate performance of each of the wireless channels to each other and which is best.

After selecting a wireless channel, the communication management resource 540 can be configured to set a no channel change timer to a value such as 24 hours. During such time, the wireless access point uses the newly selected wireless channel to support wireless communications in wireless network environment 500. After 24 hours, or occasionally, the wireless access point 105-1 considers selection of a new wireless channel based on parameters such as performance metrics, detected noise, historical usage, etc. Thus, in this embodiment, the wireless access point 105-1 can be configured to slowly change from one channel to another based on parameters such as performance information 410, presence of noise, ranking of historically best wireless channels, etc.

As previously discussed, embodiments herein can include tracking wireless channel usage. In one embodiment, for each channel that has been used, for each client, the communication management resource 540 keeps track of a distribution of RSSI (received signal strength information) levels for each channel in each band. The communication management resource 540 additionally keeps track of a distribution of uplink and downlink throughput levels for each channel and each band. After each channel change, the communication management resource 540 checks to ensure that minimum throughput and RSSI levels are maintained for each of the wireless channels such that any channel changes do not cause losing communications with certain clients. If desired, RSSI and communication re-transmission rates can be tracked to discover hidden clients that may be experiencing interference not experienced by the wireless access point 105-1.

FIG. 6 is an example diagram illustrating noise-adjusted performance information according to embodiments herein.

In this example embodiment, assume that the transmitter calibration information assigned to wireless access point 105-1 is −5 decibels for channel #1, −4 decibels for channel #2, −3 dB for channel #3, and so on as shown in the noise adjusted performance information 610 of FIG. 6.

In a manner as previously discussed, the transmitter calibration information in performance information 610 indicates different performance capabilities of the wireless access point 105-1 to wirelessly communicate (transmit) over each of multiple wireless channels in a wireless frequency band (spectrum). In the absence of noise, the calibration information in noise-adjusted performance information 610 indicates that channel #6 and channel #7 are the best channels in which to support wireless communications with respect to the wireless access point 105-1. This was discussed with respect to performance information 410.

In accordance with further embodiments, note that the wireless access point 105-1 can be configured to take into measured noise levels when choosing a wireless channel. For example, in one embodiment, the wireless access point 105-1 is configured to measure power levels of noise in a respective wireless region over each of the multiple wireless channels 1-11. In this example embodiment, as captured by noise-adjusted performance information 610, assume that the wireless access point 105-1 monitors a respective wireless region associated with network environment 500 and detects a background noise level of −95 dB in channel #1; wireless access point 105-1 detects a background noise level of −92 dB in channel #2; wireless access point 105-1 detects a background noise level of −90 dB in channel #3; wireless access point 105-1 detects a background noise level of −90 dB in channel #4; wireless access point 105-1 detects a background noise level of −88 dB in channel #5; wireless access point 105-1 detects a background noise level of −86 dB in channel #6; wireless access point 105-1 detects a background noise level of −90 dB in channel #7; wireless access point 105-1 detects a background noise level of −89 dB in channel #8; wireless access point 105-1 detects a background noise level of −90 dB in channel #9; wireless access point 105-1 detects a background noise level of −94 dB in channel #10; and wireless access point 105-11 detects a background noise level of −92 dB in channel #11.

Based on the detected amount of noise in each of the channels, the communication management resource 540 or other suitable resource generates noise-adjusted transmit calibration information 610. In general, the noise-adjusted transmit calibration information 610 takes into account the amount of noise in each of the channels to provide a better assessment of which of the channels should be selected for use.

In one embodiment, the communication management resource 540 implements the following equation to produce noise-adjusted transmit calibration information:

−Tx+(−LN+N), wherein N=Noise for channel, and LN=lowest measured noise amongst all channels.

In this example, LN=−95 dB (for channel #1). Thus, for channel #1, the noise-adjusted calibration value is equal to −(−5)+(95+(−95))=5; for channel #2, the noise-adjusted calibration value is equal to −(−4)+(95+(−92))=7; for channel #3, the noise-adjusted calibration value is equal to −(−3)+(95+(−90))=8; and so on.

Note that the lowest number in the noise-adjusted transmit calibration column of noise-adjusted performance information 610 of FIG. 6 provides the best transmit capability in view of the amount of noise present in the wireless network environment 500. In this example embodiment, the noise level associated with channel #10 is so low that it makes up for the slightly diminished capability (transmitter calibration=−2 dB) of the wireless access point 105 to transmit over the channel #10.

In accordance with further embodiments, the wireless access point 105-1 analyzes the noise-adjusted performance information 610 (i.e., a combination of the transmitter calibration information assigned to the wireless access point 105-1 in view of the measured power levels of noise in each wireless channel) to make a selection of a best channel to support subsequent wireless communications.

For example, based on the analysis of noise-adjusted performance information 610, the communication management resource 540 of wireless access point 105-1 selects wireless channel #10 of the multiple wireless channels to communicate in the network environment 500 because it is the best available wireless channel.

In accordance with further embodiments, the communication management resource 540 of the wireless access point 105-1 can be configured to compare the adjusted performance metrics with each other to identify that the noise-adjusted performance metric (i.e., noise-adjusted transmit calibration value=3 dB) for wireless channel #10 is best for transmitting amongst all of the wireless channels.

Note that the wireless access point 105-1 can be configured to monitor a wireless region (network environment 500) for noise at any suitable time such as upon power up, after establishing wireless communication links using a selected wireless channel, etc.

Taking into account detected noise, as well as the corresponding calibration information produced by analyzer resource 140, the communication management resource 540 selects a best available channel.

More specifically, based on the adjusted performance metrics as indicated by the noise-adjusted performance information 610, the communication management resource 540 selects wireless channel #10 to support wireless communications in the network environment 500 because it provides the best communication capability. Thus, even though the performance information 610 indicates that wireless channels 6 and 7 are the best performing wireless channels (when there is no noise), presence of relatively high noise in wireless channels 6 and 7 (and other wireless channels) and low noise in wireless channel #10 makes the use of wireless channel #10 a better choice for wireless communications with the mobile communication device 520-1. Alternatively, note again that if there is no or low noise in each of the wireless channels, the communication management resource 540 selects wireless channel 6 or 7 to support wireless communications in wireless network environment 500.

FIG. 7 is an example diagram illustrating noise-adjusted performance information according to embodiments herein.

In accordance with further embodiments, note that the wireless access point 105-1 can be configured to take into measured noise levels when choosing a wireless channel. For example, in one embodiment, the wireless access point 105-1 is configured to measure power levels of noise in a respective wireless region over each of the multiple wireless channels 1-11.

In this example embodiment, as captured by noise-adjusted performance information 710, assume that the wireless access point 105-1 monitors a respective wireless region associated with network environment 500 and detects a background noise level of –95 dB in channel #1; wireless access point 105-1 detects a background noise level of –92 dB in channel #2; wireless access point 105-1 detects a background noise level of –90 dB in channel #3; wireless access point 105-1 detects a background noise level of –90 dB in channel #4; wireless access point 105-1 detects a background noise level of –88 dB in channel #5; wireless access point 105-1 detects a background noise level of –86 dB in channel #6; wireless access point 105-1 detects a background noise level of –85 dB in channel #7; wireless access point 105-1 detects a background noise level of –89 dB in channel #8; wireless access point 105-1 detects a background noise level of –95 dB in channel #9; wireless access point 105-1 detects a background noise level of –84 dB in channel #10; and wireless access point 105-11 detects a background noise level of –92 dB in channel #11.

Based on the detected amount of noise in each of the channels, the communication management resource 540 or other suitable resource generates noise-adjusted transmit calibration information 710. In general, the noise-adjusted transmit calibration information 610 takes into account the amount of noise in each of the channels to provide a better assessment of which of the channels should be selected for use.

In one embodiment, the communication management resource 540 implements the following equation to produce noise-adjusted transmit calibration information:

–Rx–Tx+(–LN+N), wherein Rx=transmitter calibration, Tx=transmitter calibration, N=Noise for channel, and LN=lowest measured noise amongst all channels.

In this example, LN=–95 dB (for channel #1). Thus, the noise-adjusted calibration value for channel #1 is equal to 8; the noise-adjusted calibration value for channel #2 is equal to 9; the noise-adjusted calibration value for channel #3 is equal to 11; the noise-adjusted calibration value for channel #4 is equal to 8; etc.

During operation, the communication management resource 540 chooses the best wireless channel based on the best noise-adjusted calibration value in noise-adjusted performance information 710. In this case, the communication management resource 540 selects wireless channel #9 as the channel on which to transmit and receive data in network environment 500.

Figure 8:
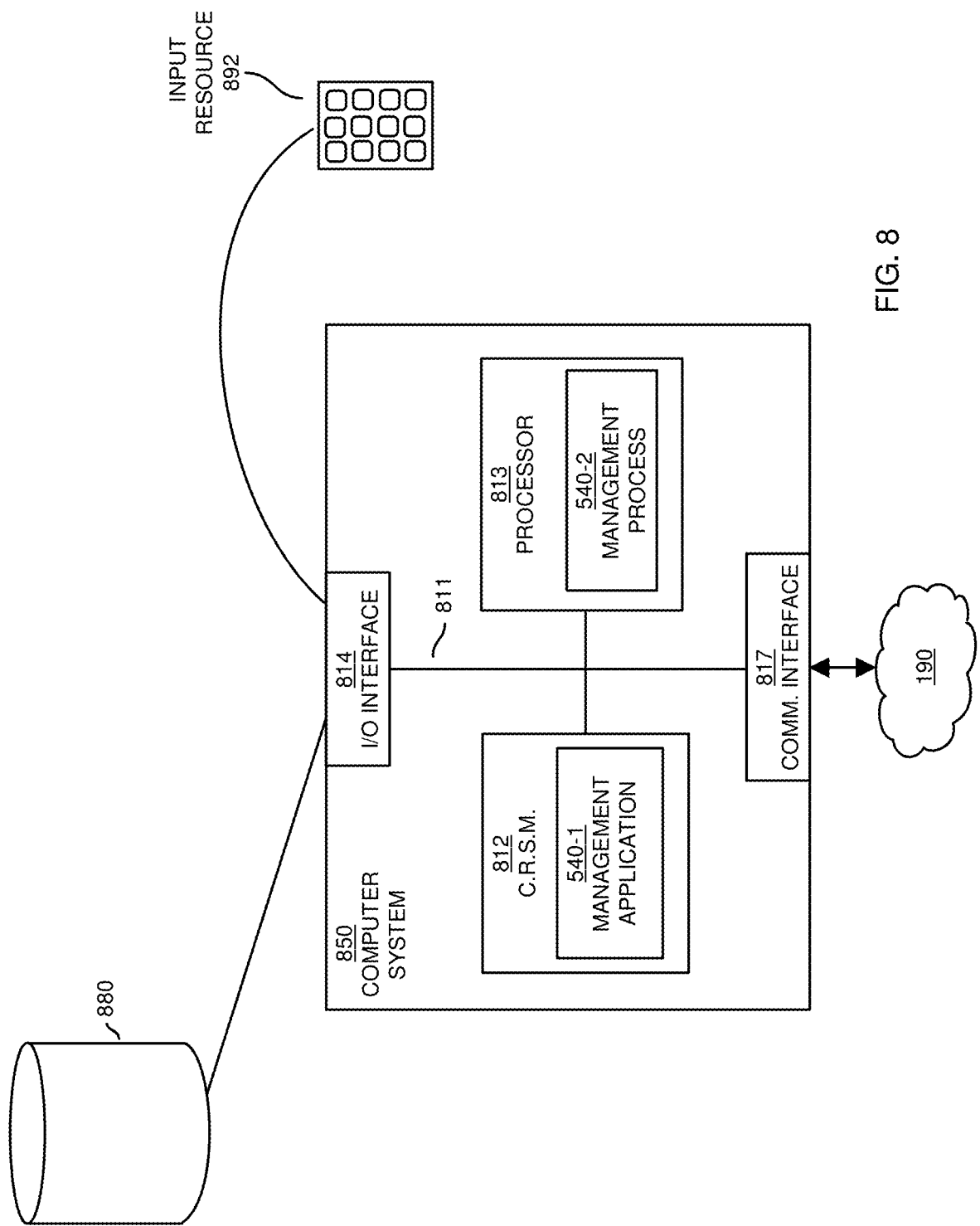
FIG. 8 is an example diagram illustrating example computer architecture operable to execute one or more operations according to embodiments herein.

FIG. 8 is an example block diagram of a computer system for implementing any of the operations as previously discussed according to embodiments herein.

Any of the resources (such as controller 110, transmitter/monitor resource 120, analyzer resource 140, communication management resource 540, communication management resource 570, etc.) as discussed herein can be configured to include computer processor hardware and/or corresponding executable instructions to carry out the different operations as discussed herein.

As shown, computer system 850 of the present example includes an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with management application 540-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in management application 540-1 stored on computer readable storage medium 812. Execution of the management application 540-1 produces management process 540-2 to carry out any of the operations and/or processes as discussed herein.

Those skilled in the art will understand that the computer system 850 can include other processes and/or software and hardware components, such as an operating system that controls allocation and use of hardware resources to management application 540-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9-12. Note that the steps in the flowcharts below can be executed in any suitable order.

Figure 9:
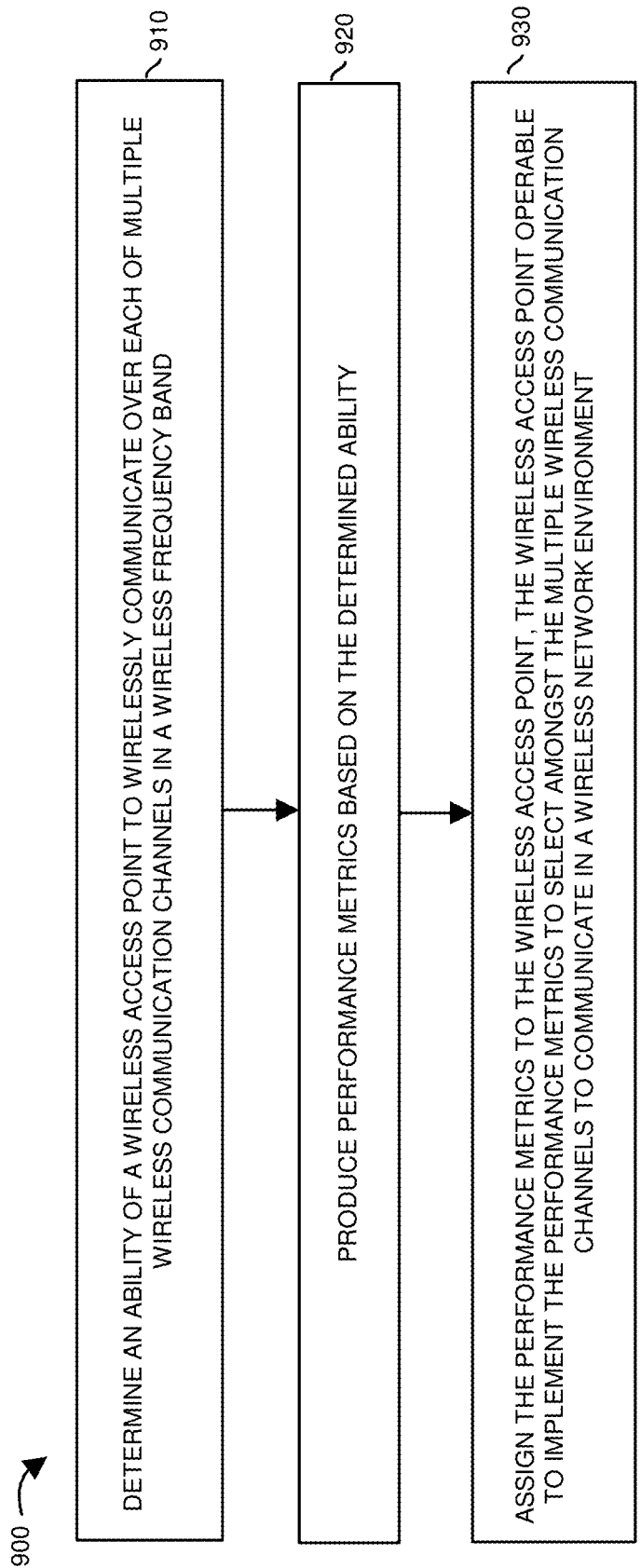
FIGS. 9-12 are example diagrams illustrating methods according to embodiments herein.

FIG. 9 is a flowchart 900 illustrating an example method according to embodiments. Note that there will be some overlap with respect to concepts as discussed above.

In processing operation 910, the analyzer resource 140 determines an ability of a wireless access point 105-1 to wirelessly communicate over each of multiple wireless communication channels in a wireless frequency band.

In processing operation 920, the analyzer resource 140 produces performance information 4210 and corresponding performance metrics based on the determined ability.

In processing operation 930, the performance information 410 and corresponding performance metrics are assigned to the wireless access point 105-1. The wireless access point 105-1 is operable to apply the performance information 410 and corresponding performance metrics to select amongst the multiple wireless communication channels to communicate in a wireless network environment 500.

Figure 10:
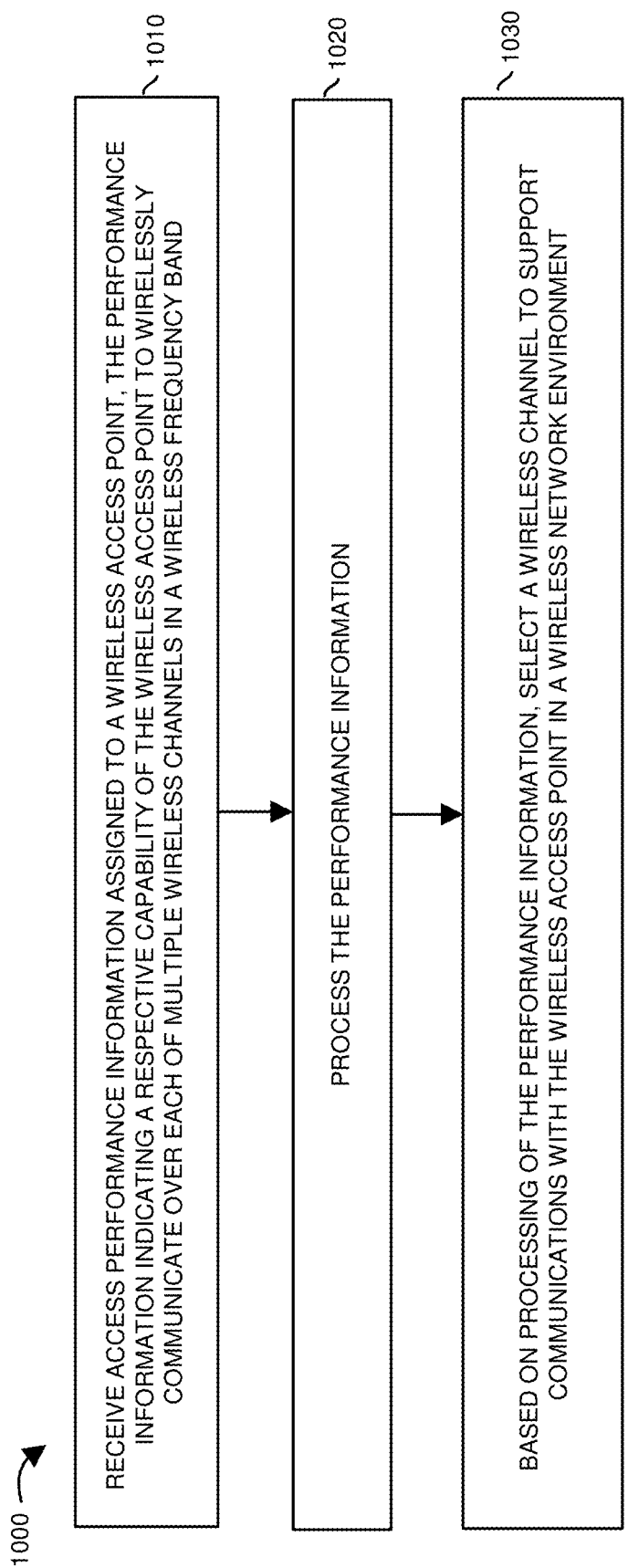

FIG. 10 is a flowchart 1000 illustrating an example method according to embodiments. Note that there will be some overlap with respect to concepts as discussed above.

In processing operation 1010, the communication management resource 540 of wireless access point 105-1 receives access performance information 410 assigned to the wireless access point 105-1. The performance information 410 indicates a respective capability of the wireless access point 105-1 to wirelessly communicate over each of multiple wireless channels in a wireless frequency band.

In processing operation 1020, the communication management resource 540 of wireless access point 105-1 processes the performance information 410.

In processing operation 1030, based on processing of the performance information, the communication management resource 540 of wireless access point 105-1 selects an appropriate wireless channel to support communications with the wireless access point 105-1 in the wireless network 500.

Figure 11:
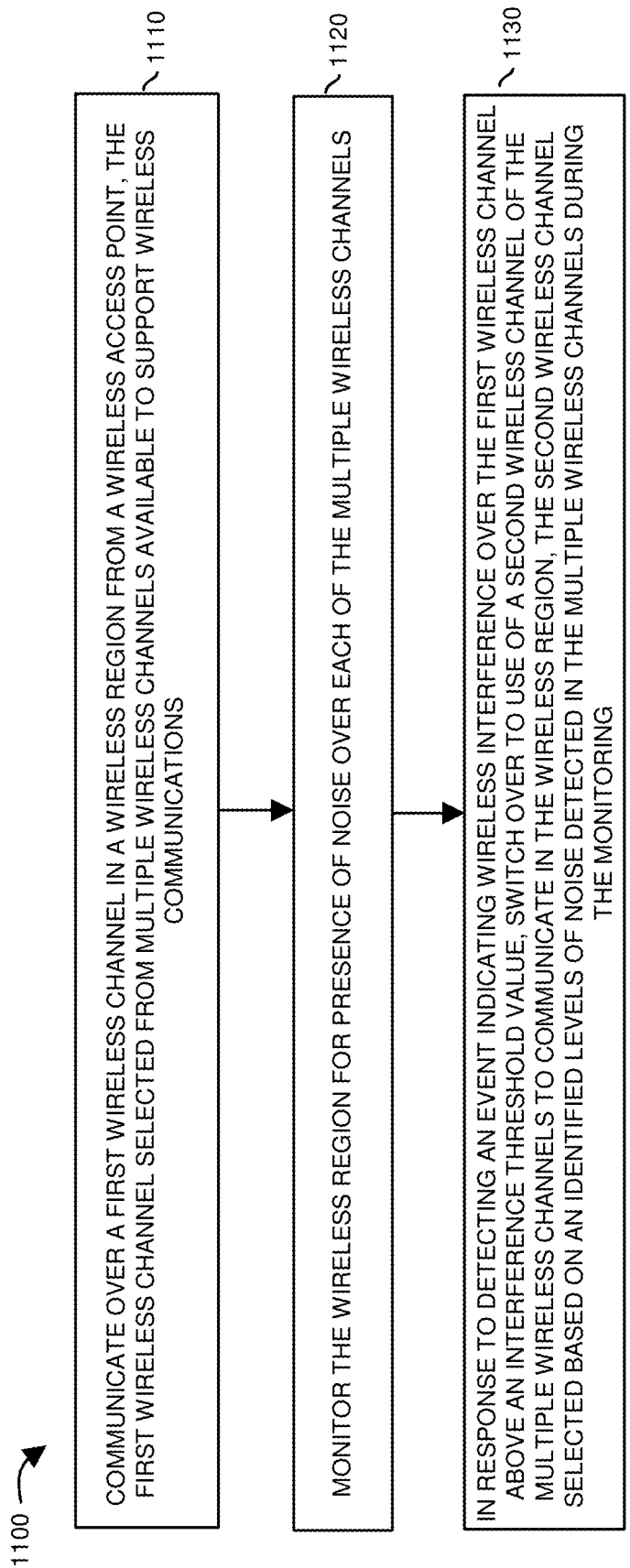

FIG. 11 is a flowchart 1100 illustrating an example method according to embodiments. Note that there will be some overlap with respect to concepts as discussed above.

In processing operation 1110, the wireless access point 105-1 communicates over a first wireless channel in a wireless region; the first wireless channel is selected from multiple wireless channels #1-11 available to support wireless communications.

In processing operation 1120, the wireless access point 105-1 monitors a wireless region for presence of noise over each of the multiple wireless channels.

In processing operation 1130, in response to detecting an event indicating wireless interference over the first wireless channel above an interference threshold value (such as occurrence of severe noise on the first wireless channel), the wireless access point 105-1 switches over to use of a second wireless channel of the multiple wireless channels to communicate in the wireless region. In one embodiment, the second wireless channel is selected based on identified levels of noise detected in the multiple wireless channels during the background monitoring of the wireless region for presence of noise. In accordance with other embodiments, the communication management resource 540 of the wireless access point selects a historically best channel to support subsequent communications.

Figure 12:
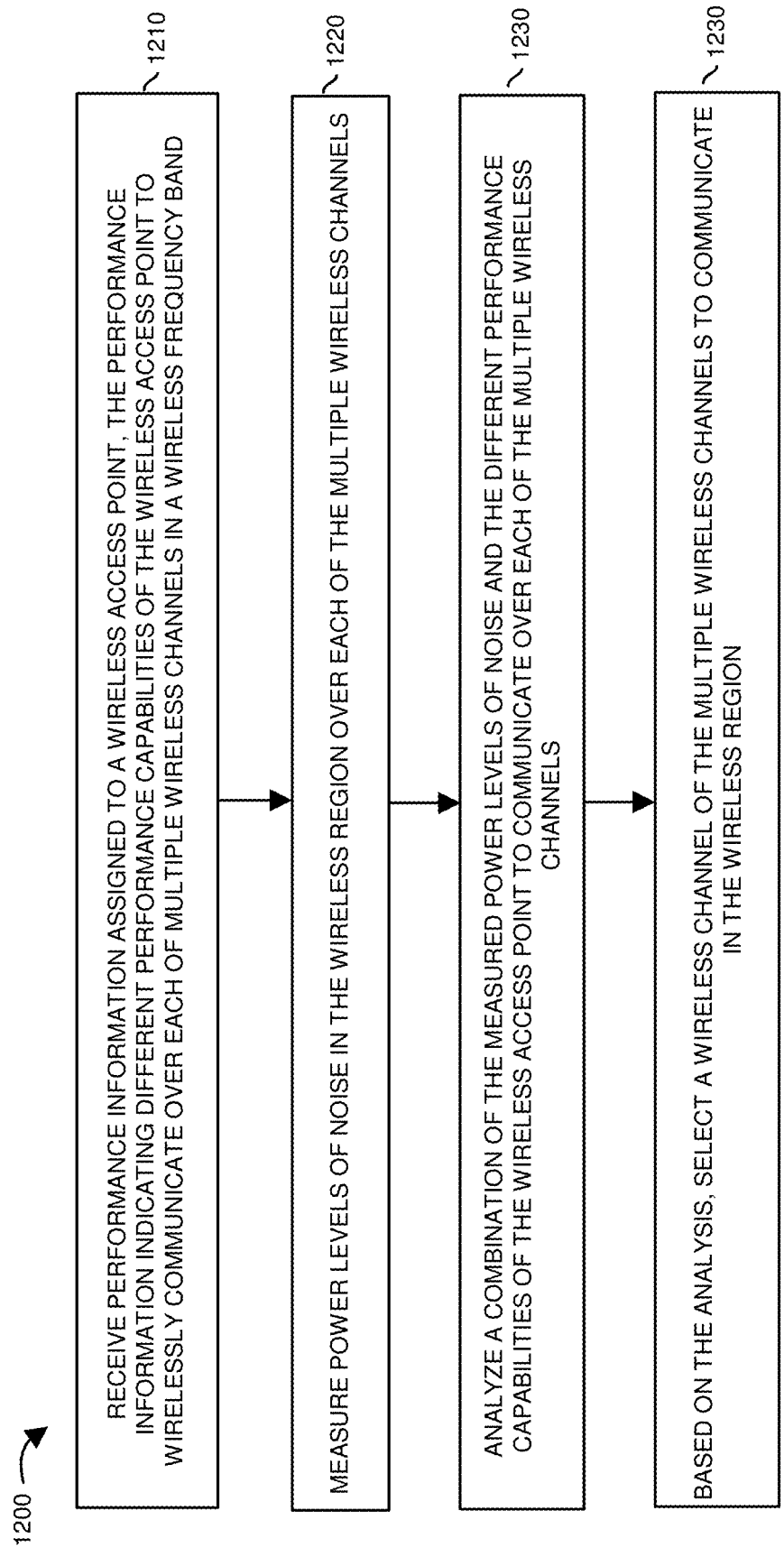

FIG. 12 is a flowchart 1200 illustrating an example method according to embodiments. Note that there will be some overlap with respect to concepts as discussed above.

In processing operation 1210, the wireless access point 105-1 receives performance information assigned to the wireless access point 105-1. The performance information 410 indicates different performance capabilities of the wireless access point 105-1 to wirelessly communicate over each of multiple wireless channels in a wireless frequency band.

In processing operation 1220, the communication management resource 540 of wireless access point 105-1 measures power levels of noise in the wireless region over each of the multiple wireless channels. This can occur in a dedicated timeslot just after boot up of the wireless access point 105-1.

In processing operation 1230, the communication management resource 540 of wireless access point 105-1 analyzes a combination of the performance information 410 in view of the measured power levels of noise in each of the wireless channels.

In processing operation 1240, based on the analysis, the communication management resource 540 of wireless access point 105-1 selects a wireless channel of the multiple wireless channels to communicate in the wireless region.

Note again that techniques herein are well suited to facilitate improved use of wireless channels in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
    accessing performance information assigned to a wireless access point, the performance information generated based on a test mode of testing operation of the wireless access point communicating over each of multiple wireless communication channels in a wireless frequency band, the performance information indicating a respective capability of the wireless access point to communicate over each of the multiple wireless communication channels in the wireless frequency band in the test mode;
    subsequent to the test mode, during in-field operation of the wireless access point in a wireless network environment: i) processing the performance information assigned to the wireless access point, and ii) based on processing of the performance information generated based on the test mode of testing operation of the wireless access point, selecting a wireless communication channel from the multiple wireless communication channels to support communications associated with the wireless access point; and
    wherein the performance information indicates an amount by which an actual wireless output power level of the wireless access point differs from a corresponding output power level setting of the wireless access point used to produce the actual wireless output power level from the wireless access point.

2. The method as in claim 1 further comprising:
    processing the performance information and selecting the wireless communication channel in response to initial activation of the wireless access point during the in-field operation subsequent to the test mode, the selected wireless communication channel being a default wireless communication channel as specified by the performance information.

3. The method as in claim 1 further comprising:
    via the wireless access point, during the in-field operation of the wireless access point subsequent to the test mode, measuring RF (Radio Frequency) noise present in a wireless region in each of the multiple wireless channels;
    selecting the wireless channel based on a combination of the performance information generated via the test mode and measured RF noise in each of the multiple wireless channels; and
    utilizing the selected wireless channel to communicate during the in-field operation of the wireless access point.

4. The method as in claim 3 further comprising:
    selecting the wireless communication channel based at least in part on channel utilization time of one or more other wireless access points utilizing the multiple wireless communication channels in the wireless region.

5. The method as in claim 1, wherein the performance information includes performance metrics ranking the multiple wireless communication channels based on detected transmit power strength of the wireless access point, as determined during the test mode, in each of the wireless communication channels for a same power output setting of the wireless access point over all of the multiple wireless communication channels.

6. The method as in claim 1, wherein the performance information ranks the multiple wireless communication channels based on receiver sensitivity of the wireless access point in each of the multiple wireless communication channels as detected during the test mode of testing operation of the wireless access point.

7. A method comprising:
    accessing performance information assigned to a wireless access point, the performance information generated based on a test mode of testing operation of the wireless access point communicating over each of multiple wireless communication channels in a wireless frequency band, the performance information indicating a respective capability of the wireless access point to communicate over each of the multiple wireless communication channels in the wireless frequency band in the test mode; and
    subsequent to the test mode, during in-field operation of the wireless access point in a wireless network environment: i) processing the performance information assigned to the wireless access point, and ii) based on processing of the performance information generated based on the test mode of testing operation of the wireless access point, selecting a wireless communication channel from the multiple wireless communication channels to support communications associated with the wireless access point;
    wherein the performance information generated based on operation of the wireless access point in the test mode includes:
    a first performance metric determined during the test mode, the first performance metric assigned to a first wireless communication channel of the multiple wireless communication channels;
    a second performance metric determined during the test mode, the second performance metric assigned to a second wireless communication channel of the multiple wireless communication channels;
    wherein the first performance metric indicates that the wireless access point transmits wireless communications over the first wireless communication channel at a higher output power than over the second wireless communication channel for a baseline transmitter power setting of the wireless access point;
    wherein the first performance metric indicates a first amount in which an actual wireless output power level from the wireless access point differs from the baseline transmitter power setting for the first wireless communication channel; and
    wherein the second performance metric indicates a second amount in which an actual wireless output power level from the wireless access point differs from the baseline transmitter power setting for the second wireless communication channel.

8. The method as in claim 7, wherein processing the performance information during the in-field operation of the wireless access point includes:
comparing the first performance metric and the second performance metric; and
based on the comparison, selecting the first wireless communication channel in response to detecting that the wireless access point produces a higher power output level for communications over the first wireless communication channel than the second wireless communication channel.

9. The method as in claim 1, wherein the performance information includes:
a first performance metric generated based on the test mode of testing operation of the wireless access point, the first performance metric assigned to a first wireless communication channel of the multiple wireless communication channels;
a second performance metric generated based on the test mode of testing operation of the wireless access point, the second performance metric assigned to a second wireless communication channel of the multiple wireless communication channels; and
wherein the first performance metric indicates that the wireless access point has a better receiver sensitivity to receive wireless communications over the first wireless communication channel than over the second wireless communication channel.

10. The method as in claim 1, wherein processing the performance information includes identifying a default wireless channel as specified by the performance information; and
wherein selecting the wireless channel includes selecting the default wireless channel to support communications in the wireless network environment via the wireless access point.

11. The method as in claim 1, wherein the performance information generated based on the test mode of testing operation of the wireless access point indicates that the wireless access point produces a highest transmit power output strength via a first wireless communication channel of the multiple wireless communication channels; and
wherein the performance information generated based on the test mode of testing operation of the wireless access point indicates that the wireless access point provides a best receiver performance of receiving wireless communications via a second wireless communication channel of the multiple wireless communication channels.

12. The method as in claim 1, wherein the selected wireless channel is a first wireless communication channel of the multiple wireless communication channels, the method further comprising:
subsequent to the test mode, during in-field operation of the wireless access point in the wireless network environment: i) measuring noise present in a wireless region of the wireless network environment over each of the multiple wireless communication channels; and ii) in response to detecting non-use of the wireless access point for an amount of time greater than a threshold amount of time in the wireless region, selecting a second wireless communication channel of the multiple wireless communication channels, the second wireless communication channel selected based on a combination of the performance information and the measured noise.

13. The method as in claim 1, wherein the selected wireless communication channel is a first wireless communication channel, the method further comprising
subsequent to the test mode, during in-field operation of the wireless access point in the wireless network environment: i) measuring power levels of noise in a wireless region present in each of the multiple wireless communication channels; and ii) in response to detecting an event indicating wireless interference over the first wireless communication channel above an interference threshold value, selecting a second wireless communication channel of the multiple wireless communication channels to communicate in the wireless region instead of using the first wireless communication channel, the second wireless communication channel selected based on the measured level of noise detected in the multiple wireless communication channels.

14. The method as in claim 1, wherein the selected wireless communication channel is a first wireless communication channel of the multiple wireless communication channels, the method further comprising:
tracking performance of communicating with mobile communication devices over the first wireless communication channel;
switching to use of a second wireless communication channel of the second wireless communication channels to communicate with the mobile communication devices; and
tracking performance of communicating with the mobile communication devices over the second wireless communication channel.

15. The method as in claim 14 further comprising:
subsequent to the switching, verifying that a respective wireless communication link between the wireless access point and the mobile communication device supports communications above a performance threshold value.

16. A wireless communication system comprising:
an antenna to transmit and receive wireless communications from a wireless access point; and
communication management hardware operable to:
access performance information assigned to the wireless access point, the performance information generated based on a test mode of testing operation of the wireless access point at each of multiple wireless communication channels in a wireless frequency band, the performance information indicating a respective capability of the wireless access point to communicate over each of the multiple wireless communication channels in the wireless frequency band;
subsequent to the test mode, during in-field operation of the wireless access point in a wireless network environment: i) process the performance information assigned to the wireless access point, and ii) based on processing of the performance information generated based on the test mode of testing the wireless access point, select a wireless communication channel from the multiple wireless communication channels to support communications associated with the wireless access point during the in-field operation; and
wherein the performance information is generated based on a combination of: i) wireless receiver performance information generated by a wireless receiver disposed in the wireless access point, and ii) wireless access point transmitter performance information generated by a wireless receiver disparately located with respect to the wireless access point.

17. The wireless communication system as in claim 16, wherein the communication management hardware is further operable to:
process the performance information and select the wireless communication channel in response to initial activation of the wireless access point during the in-field operation subsequent to the test mode, the selected wireless communication channel being a default wireless communication channel as specified by the performance information.

18. The wireless communication system as in claim 16, wherein the communication management hardware is further operable to:
during the in-field operation of the wireless access point subsequent to the test mode, measure RF noise in a wireless region over each of the multiple wireless channels; and
select the wireless channel based on a combination of the performance information generated via the test mode and measured RF noise in each of the multiple wireless channels.

19. The wireless communication system as in claim 18, wherein the communication management hardware is further operable to:
select the wireless communication channel based at least in part on channel utilization time of one or more other wireless access points utilizing the multiple wireless communication channels in the wireless region.

20. The wireless communication system as in claim 16, wherein the performance information includes performance metrics ranking the multiple wireless communication channels, as determined during the test mode, based on transmit power strength of the wireless access point in each of the wireless communication channels.

21. The wireless communication system as in claim 16, wherein the performance information ranks the multiple wireless communication channels based on receiver sensitivity of the wireless access point in each of the multiple wireless communication channels as detected during the test mode.

22. The wireless communication system as in claim 16, wherein the performance information generated based on operation of the wireless access point in the test mode includes:
a first performance metric determined during the test mode, the first performance metric assigned to a first wireless communication channel of the multiple wireless communication channels;
a second performance metric determined during the test mode, the second performance metric assigned to a second wireless communication channel of the multiple wireless communication channels; and
wherein the first performance metric indicates that the wireless access point transmits wireless communications over the first wireless communication channel at a higher output power than over the second wireless communication channel for a baseline power setting.

23. The wireless communication system as in claim 22, wherein the communication management hardware is further operable to:
compare the first performance metric and the second performance metric; and
based on the comparison, select the first wireless communication channel in response to detecting that the wireless access point produces a higher power output level for communications over the first wireless communication channel than the second wireless communication channel.

24. The wireless communication system as in claim 16, wherein the performance information includes:
a first performance metric generated based on the test mode of testing operation of the wireless access point, the first performance metric assigned to a first wireless communication channel of the multiple wireless communication channels;
a second performance metric generated based on the test mode of testing operation of the wireless access point, the second performance metric assigned to a second wireless communication channel of the multiple wireless communication channels; and
wherein the first performance metric indicates that the wireless access point has a better receiver sensitivity to receive wireless communications over the first wireless communication channel than over the second wireless communication channel.

25. The wireless communication system as in claim 16, wherein the communication management hardware is further operable to:
identify a default wireless channel as specified by the performance information; and
select the default wireless channel to support communications in the wireless network environment via the wireless access point.

26. The wireless communication system as in claim 16, wherein the performance information generated based on the test mode of testing operation of the wireless access point indicates that the wireless access point produces a highest transmit power output strength via a first wireless communication channel of the multiple wireless communication channels; and
wherein the performance information generated based on the test mode of testing operation of the wireless access point indicates that the wireless access point provides a best receiver performance of receiving wireless communications via a second wireless communication channel of the multiple wireless communication channels.

27. The wireless communication system as in claim 16, wherein the selected wireless channel is a first wireless communication channel of the multiple wireless communication channels, the communication management hardware further operable to:
subsequent to the test mode, during in-field operation of the wireless access point in a wireless network environment: i) measure noise present in a wireless region of the wireless network environment over each of the multiple wireless communication channels; and ii) in response to detecting non-use of the wireless access point for an amount of time greater than a threshold amount of time in the wireless region, select a second wireless communication channel of the multiple wireless communication channels, the second wireless communication channel selected based on a combination of the performance information and the measured noise.

28. The wireless communication system as in claim 16, wherein the selected wireless communication channel is a first wireless communication channel, the communication management hardware further operable to:
subsequent to the test mode, during in-field operation of the wireless access point in a wireless network environment: i) measure power levels of noise in the wireless region over each of the multiple wireless channels, and ii) in response to detecting an event indicating wireless interference over the first wireless communication channel above an interference threshold value, select a second wireless communication channel of the multiple wireless communication channels to communicate in the wireless region instead of using the first wireless communication channel, the second wireless communication channel selected based on the measured level of noise detected in the multiple wireless communication channels.

29. The wireless communication system as in claim 16, wherein the selected wireless communication channel is a first wireless communication channel, the communication management hardware further operable to:
    track performance of communicating with mobile communication devices over the first wireless communication channel;
    switch to use of a second wireless communication channel to communicate with the mobile communication devices; and
    track performance of communicating with the mobile communication devices over the second wireless communication channel.

30. The wireless communication system as in claim 29, wherein the communication management hardware is further operable to:
    subsequent to switching, verify that each of the respective wireless communication links between the wireless access point and the mobile communication devices supports communications above a performance threshold value.

31. Computer-readable storage hardware having instructions stored thereon, the instructions, when carried out by computer processor hardware, cause the computer processor hardware to:
    access performance information assigned to the wireless access point, the performance information generated based on a test mode of testing operation of the wireless access point at each of multiple wireless communication channels in a wireless frequency band, the performance information indicating a respective capability of the wireless access point to communicate over each of the multiple wireless communication channels in a wireless frequency band; and
    subsequent to the test mode, during in-field operation of the wireless access point in a wireless network environment: i) process the performance information assigned to the wireless access point; and ii) based on processing of the performance information generated based on the test mode of testing the wireless access point, select a wireless communication channel from the multiple wireless communication channels to support communications associated with the wireless access point; and
    wherein the performance information indicates an amount by which an actual wireless output power level of the wireless access point differs from a corresponding output power level setting of the wireless access point used to produce the actual wireless output power level from the wireless access point.

32. The method as in claim 1, wherein the testing of the wireless access point occurs prior to the in-field operation use of the wireless access point to monitor the wireless network environment and use of the multiple wireless communication channels.

33. The method as in claim 1, wherein the performance information is calibration information assigned to the wireless access point based on the testing.

34. The method as in claim 1, wherein the performance information is calibration information assigned to the wireless access point, the calibration information capturing inaccuracies of a corresponding transmitter associated with the wireless access point.

35. The method as in claim 1, wherein the performance information includes a ranking of each of the multiple wireless communication channels in the frequency band.

36. A method comprising:
    accessing performance information assigned to a wireless access point, the performance information generated based on a test mode of testing operation of the wireless access point communicating over each of multiple wireless communication channels in a wireless frequency band, the performance information indicating a respective capability of the wireless access point to communicate over each of the multiple wireless communication channels in the wireless frequency band in the test mode; and
    subsequent to the test mode, during in-field operation of the wireless access point in a wireless network environment: i) processing the performance information assigned to the wireless access point, and ii) based on processing of the performance information generated based on the test mode of testing operation of the wireless access point, selecting a wireless communication channel from the multiple wireless communication channels to support communications associated with the wireless access point;
    wherein the performance information includes a ranking of each of the wireless communication channels in the frequency band;
    wherein the ranking indicates a first wireless communication channel of the multiple wireless communication channels as producing best transmitter power output associated with transmitted communications from the wireless access point; and
    wherein the ranking indicates a second wireless communication channel of the multiple wireless communication channels as providing best receiver performance of receiving wireless communications at the wireless access point.

37. The method as in claim 1, wherein the performance information is generated based on: i) test signals transmitted to the wireless access point during the test mode; and ii) test signals transmitted from the wireless access point during the test mode.

38. A method comprising:
    accessing performance information assigned to a wireless access point, the performance information generated based on a test mode of testing operation of the wireless access point communicating over each of multiple wireless communication channels in a wireless frequency band, the performance information indicating a respective capability of the wireless access point to communicate over each of the multiple wireless communication channels in the wireless frequency band in the test mode; and
    subsequent to the test mode, during in-field operation of the wireless access point in a wireless network environment: i) processing the performance information assigned to the wireless access point, and ii) based on processing of the performance information generated based on the test mode of testing operation of the wireless access point, selecting a wireless communication channel from the multiple wireless communication channels to support communications associated with the wireless access point;

wherein the performance information is generated based on a combination of: i) wireless receiver performance information generated by a wireless receiver disposed in the wireless access point, and ii) wireless access point transmitter performance information generated by a wireless receiver disparately located with respect to the wireless access point.

39. The method as in claim 1, wherein the performance information is generated based on synchronizing transmission of test wireless communications over each of the wireless communication channels from the wireless access point and monitoring of the test wireless communications via a monitor resource.

* * * * *

UNITED STATES PATENT AND TRADEMARK OFFICE
CERTIFICATE OF CORRECTION

PATENT NO. : 10,736,114 B2
APPLICATION NO. : 15/866737
DATED : August 4, 2020
INVENTOR(S) : Matthew J. Dillon Page 1 of 1

It is certified that error appears in the above-identified patent and that said Letters Patent is hereby corrected as shown below:

In the Claims

Column 31, Line 65, before the word "of" delete "use"

Signed and Sealed this
Twenty-ninth Day of September, 2020

Andrei Iancu
*Director of the United States Patent and Trademark Office*